(12) United States Patent
McClure

(10) Patent No.: US 9,896,162 B2
(45) Date of Patent: Feb. 20, 2018

(54) SUBMERSIBLE VESSEL HAVING RETRACTABLE WING AND KEEL ASSEMBLIES

(71) Applicant: Ocean Aero, Inc., San Diego, CA (US)

(72) Inventor: Vance E. McClure, Cardiff, CA (US)

(73) Assignee: Ocean Aero Inc., San Diego, CA (US)

( * ) Notice: Subject to any disclaimer, the term of this patent is extended or adjusted under 35 U.S.C. 154(b) by 0 days.

(21) Appl. No.: 14/121,093

(22) Filed: Jul. 29, 2014

(65) Prior Publication Data
US 2015/0210359 A1 Jul. 30, 2015

Related U.S. Application Data

(60) Provisional application No. 61/958,522, filed on Jul. 29, 2013.

(51) Int. Cl.
*B63B 35/00* (2006.01)
*B63B 15/00* (2006.01)
(Continued)

(52) U.S. Cl.
CPC .......... *B63B 15/00* (2013.01); *B63B 15/0083* (2013.01); *B63B 41/00* (2013.01);
(Continued)

(58) Field of Classification Search
CPC ... B63H 9/00; B63H 9/04; B63H 9/06; B63H 9/0607; B63H 9/0685; B63H 9/08; B63H 2009/00; B63H 2009/04; B63H 2009/06; B63H 2009/0607; B63H 2009/0621; B63H 2009/0635; B63H 2009/0657; B63H 2009/0685; B63H 2009/08; B63G 8/00;
(Continued)

(56) References Cited

U.S. PATENT DOCUMENTS 3,580,203 A * 5/1971 Martin ................. B63H 9/0607
114/102.16
3,800,724 A * 4/1974 Tracy ...................... B63B 1/285
114/280
(Continued)

FOREIGN PATENT DOCUMENTS

BE 1 017 587 1/2009
WO WO 2005/012079 2/2005

*Primary Examiner* — Daniel V Venne
(74) *Attorney, Agent, or Firm* — Todd N. Hathaway

(57) ABSTRACT

A submersible vessel having wing and keel assemblies that are extendable for wind-powered surface operation and retractable to reduce drag for submerged operation or to place the vessel in a more compact configuration. A deployment mechanism including an actuator and linkage pivots the wing and keel assemblies simultaneously between the deployed and retracted configuration. The vessel may have first and second pressure hulls flanking the wing and keel assemblies. A drive mechanism including a motor and a gear train employing pulley-and-cable assemblies rotates either the wing and flap together such that the flap angle relative to the wing is constant, or to change the flap angle relative to the wing with the wing angle of incidence held constant. The invention also provides a retractable wind-powered propulsion apparatus that is mountable to the hull assembly of a submersible or non-submersible vessel.

32 Claims, 12 Drawing Sheets

(51) Int. Cl.
  *B63G 8/00* (2006.01)
  *B63H 9/04* (2006.01)
  *B63B 41/00* (2006.01)
  *B63G 8/08* (2006.01)
  *B63G 8/22* (2006.01)
  *B63H 9/06* (2006.01)

(52) U.S. Cl.
  CPC ............... *B63G 8/00* (2013.01); *B63G 8/001* (2013.01); *B63G 8/08* (2013.01); *B63G 8/22* (2013.01); *B63H 9/04* (2013.01); *B63H 9/0607* (2013.01); *B63B 2015/0058* (2013.01); *B63B 2035/007* (2013.01); *B63B 2041/003* (2013.01); *B63G 2008/004* (2013.01); *Y02T 70/583* (2013.01)

(58) Field of Classification Search
  CPC . B63G 8/001; B63G 8/08; B63G 8/22; B63G 2008/00; B63G 2008/001; B63G 2008/08; B63B 2015/005; B63B 2015/0058; B63B 2015/0066; B63B 41/00; B63B 2041/00; B63B 2041/003; B63B 15/0083; B63B 2015/00; B63B 2015/16
  USPC ......... 114/39.21, 39.22, 39.31, 39.32, 102.1, 114/102.13, 102.14, 102.15, 102.16, 114/102.22, 102.29, 108, 121, 126, 130, 114/140, 141
  See application file for complete search history.

(56) References Cited

U.S. PATENT DOCUMENTS

| | | | | |
|---|---|---|---|---|
| 3,844,238 A | * | 10/1974 | Murray | ................ B63H 9/0607 114/39.31 |
| 4,402,277 A | | 9/1983 | Wainwright | |
| 4,467,741 A | | 8/1984 | Walker | |
| 4,543,899 A | * | 10/1985 | Walker | ................ B63H 9/0607 114/102.16 |
| 4,563,971 A | * | 1/1986 | Carver | .................... B63B 41/00 114/132 |
| 4,685,410 A | * | 8/1987 | Fuller | .................. B63H 9/0607 114/102.22 |
| 4,770,113 A | | 9/1988 | Walker | |
| 4,843,987 A | * | 7/1989 | Samuels | ............. B63H 9/0607 114/102.18 |
| 4,982,679 A | | 6/1991 | Walker | |
| 5,622,131 A | * | 4/1997 | Walker | ................ B63H 9/0607 114/102.29 |
| 5,860,381 A | | 1/1999 | Fernandini | |
| 6,105,524 A | * | 8/2000 | Dane | .................... B63H 9/0607 114/102.27 |
| 7,461,609 B1 | * | 12/2008 | Ott | ....................... B63H 9/0607 114/102.1 |
| 9,003,986 B2 | * | 4/2015 | Jenkins | ..................... B63B 9/02 114/102.16 |
| 2006/0150887 A1 | | 7/2006 | Liang | |

* cited by examiner

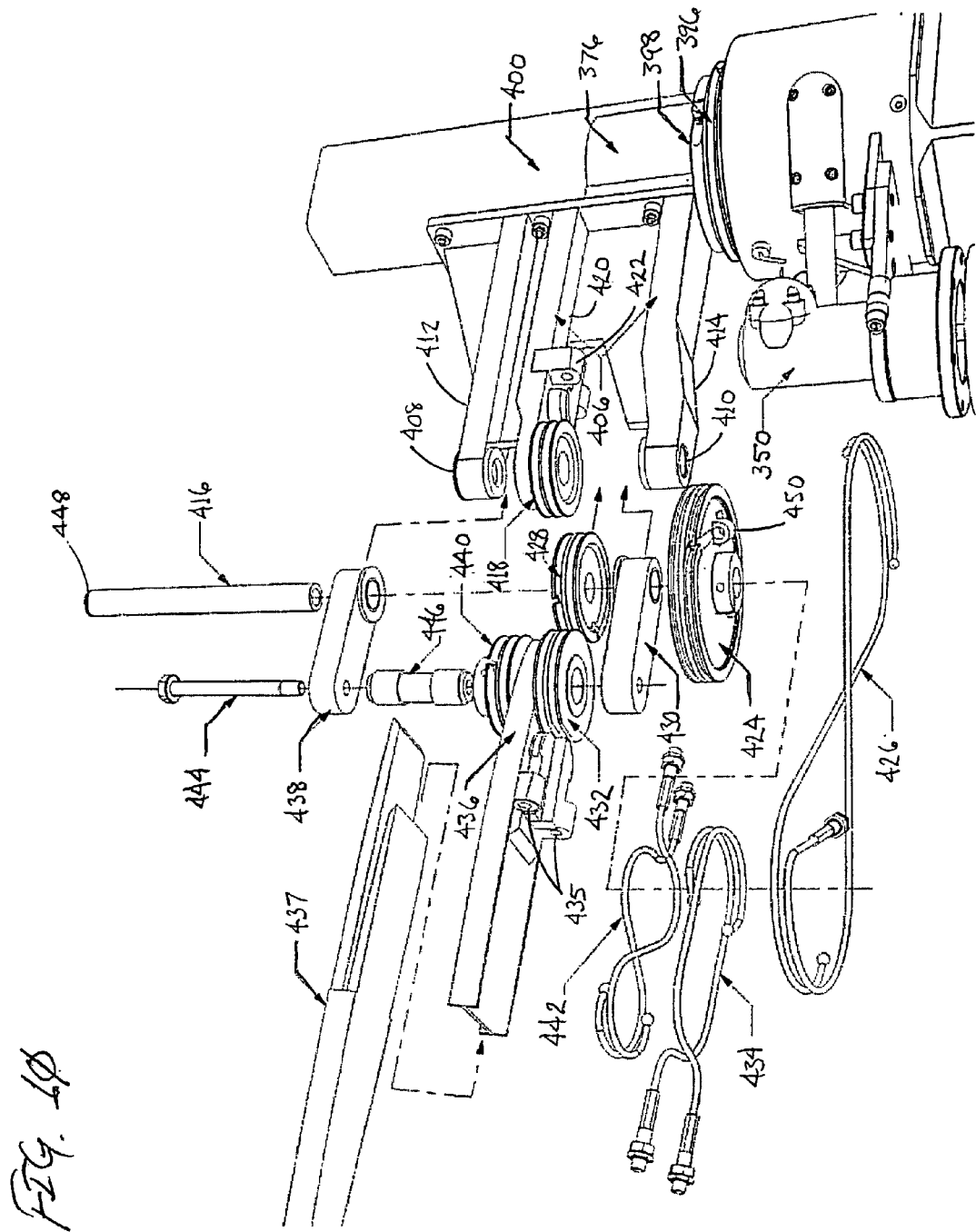

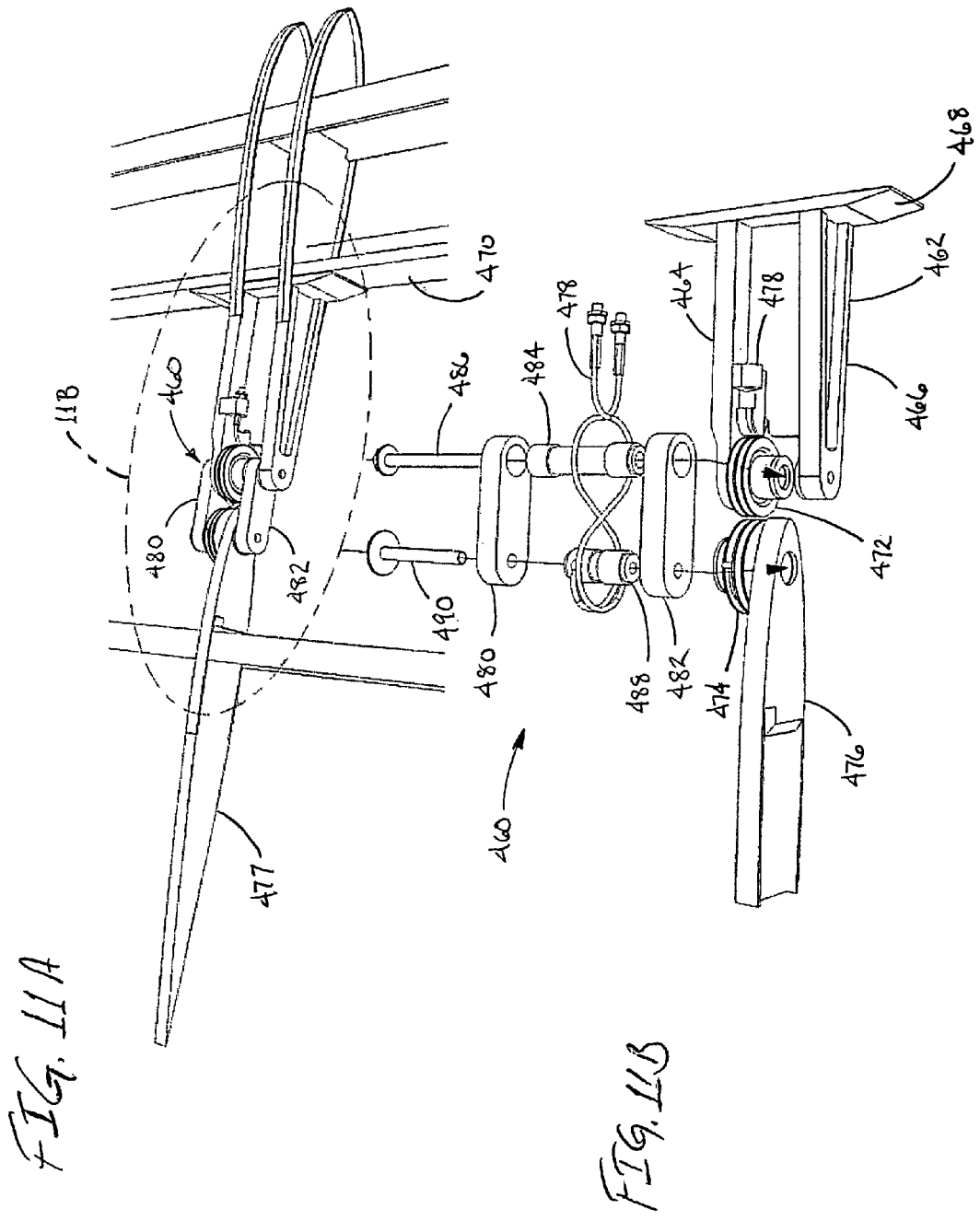

SUBMERSIBLE VESSEL HAVING RETRACTABLE WING AND KEEL ASSEMBLIES

RELATED APPLICATIONS

This application claims the benefit of U.S. Provisional Patent Application No. 61/958,522 filed Jul. 29, 2013.

BACKGROUND a. Field of the Invention

The present invention relates generally to submersible vessels, and, more particularly, to a wind-powered submersible vessel having wing and keel assemblies that are retractable for submerged operation of the vessel.

b. Related Art

Submersible vessels are waterborne craft capable of surfaced or submerged operation, in a marine environment or other body of water. As is well known, submersible vessels enjoy many advantages for both military and civilian functions, including reduced detectability, avoidance of adverse weather and surface traffic, and the ability to approach/investigate underwater targets, amongst others.

Historically, submersible vessels have taken the form of manned submarines, most commonly using diesel electric or nuclear propulsion systems. The construction and operating costs inherent in manned submarines, in combination with the size required to accommodate the personnel and machinery, have caused them to be restricted mainly to naval use, and even then to only a few of the many potential missions for submersible vessels. For example, manned naval submarines have long been successful in anti-ship and ballistic-missile submarine missions, but their high cost and large size have counted against them for other missions such as long-term surveillance, mine hunting and inshore/shallow water operations, for example. Unfilled potential for submersible vessels also exists in commercial and civilian government realms, such as oil exploration, fisheries monitoring and law enforcement roles, for example.

Recent advances in electronics and controls have opened new horizons for submersible vessels, including increased possibilities for autonomous, unmanned operation. Similar to unmanned aerial vehicles (UAVs), the absence of human support systems allows the vessel to be much smaller and vastly less expensive and, in the case of a seaborne vessel, to have the possibility of virtually unlimited on-station time. These factors in turn open the door for submersible vessels to perform a wide range of missions for which they were not previously viable.

However, certain challenges remain. For example, even in the absence of human support systems there is a need for electrical power, e.g., for the guidance and electronic sensor/communication systems typically necessary for the craft to perform its mission. Similarly, there is a continuing need for propulsion, whether to investigate/intercept targets or to simply proceed on a course/speed or maintain a position in seaway, but with a heightened need that the means of propulsion be both compact and inexpensive in nature. Potentially autonomous operation also means that such systems need to be reliable and capable of operation with little or no maintenance or other human intervention.

An added challenge is that such a craft to be able to function efficiently in both surfaced and submerged modes it must satisfy somewhat conflicting requirements. To operate effectively when surfaced, the craft must have a configuration that enables it to achieve satisfactory stability and control when subjected to wind and wave action. When submerged, the craft is usually less subject to wind/wave action, but in turn it becomes important that the craft have a hydrodynamically "clean" configuration and minimal drag such that it can travel and maneuver underwater in an efficient manner.

Yet another factor, mundane yet nevertheless important, is that an unmanned submersible vessel (similar to the case with a UAV) will most typically be transported to an operating area onboard a parent vessel, possibly in combination with other units, as opposed to transiting independently from a remote port. Consequently, there is a need that the submersible vessel be readily configurable in a compact form for transportation, preferably being able to fit within a standardized shipping container such as a "CONEX" box. Similarly, there is a need that the vessel be simple and safe to deploy once it is in the mission area, and that it be able to withstand the handling involved in launching and/or recovery without incurring damage. It is also important that the design and construction of such a vessel provide it with strength, durability and survivability adequate to meet the requirements of its intended purpose, for example, to withstand adverse environmental conditions or impact/shock incurred in a military mission.

SUMMARY OF THE INVENTION

The present invention addresses the matters discussed above, and provides a submersible vessel having a wing and keel assemblies that are extensible for wind-powered surface operation of the vessel, and retractable to reduce drag for submerged operation of the vessel and/or to place the vessel in a more compact configuration for transportation/storage.

In a first aspect, the invention provides a vessel comprising: A hull assembly; a wing assembly comprising at least one substantially rigid wing member; a keel assembly comprising at least one keel member; and a deployment mechanism comprising at least one actuator and a linkage interconnecting the wing assembly and the keel assembly, that in response to operation of the actuator pivots said wing assembly and keel assembly simultaneously between (i) a deployed configuration in which said wing assembly and keel assembly extend outwardly above and below the hull assembly for wind-powered surfaced operation of said vessel; and (ii) a retracted configuration in which said wing assembly and keel assembly are angled back towards a stern end said hull assembly to reduce drag for submerged operation of the vessel.

The linkage of the deployment mechanism may comprise a crank member that is supported from the hull assembly for rotation about a first substantially horizontal axis. The actuator may comprise a linear actuator pivotally connected to the crank member for rotation about a second horizontal axis that is offset below said first axis to form a lever arm between the two, so that the crank member pivots in a generally vertical plane in response to operation of the actuator. The actuator may comprise at least one linear actuator having a first end mounted to the hull assembly and a second end mounted to the crank member. The linear actuator may comprise at least one hydraulic cylinder.

The crank member of the operating linkage may comprise an upper portion having the wing assembly mounted thereto, so that the wing member is raised in response to the crank member being pivoted towards a vertical orientation and lowered in response to the crank member being pivoted towards a horizontal orientation. The crank member may further comprise a lower portion having the keel member of the keel assembly mounted thereto, so that the keel member is lowered in response to the crank member being pivoted towards a vertical orientation and is raised in response to the crank member being pivoted towards a horizontal orientation. The linkage may further comprise a pivot connection joining the lower portion of the crank member with an upper portion of the keel member for rotation about a third horizontal axis, about which the keel assembly and wing assembly pivot so as to converge and diverge angularly as the assemblies are retracted and extended. The wing assembly and keel assembly may converge towards a stern end of the hull assembly when moving towards the retracted configuration.

The hull assembly may comprise an opening that receives the wing assembly when lowered to the retraced configuration. The recess may comprise a longitudinal channel shaped to receive and support the wing assembly in the retracted configuration. The channel may comprise a channel area formed in an upper side of the hull assembly.

The wing assembly may comprise a motor and gear box that orientate the wing member relative to the hull assembly in response to a control input. The motor and gear box may orientate the at least one wing member relative to the hull assembly and to wind direction to produce propulsive force when the wing assembly is in the deployed configuration. The motor and gear box may operate to orientate the at least one wing member so as to be received in the support channel when the wing assembly is in the retracted configuration.

The keel assembly may further comprise a keel bulb pivotally mounted to a lower portion of the keel member for rotation about a fourth horizontal axis, and a linkage that maintains the keel bulb in a generally horizontal orientation as the keel assembly is extended and retracted. The linkage that maintains the keel bulb in a substantially horizontal orientation may comprise a link member having a first end mounted to the hull assembly and a second end, a horizontal axis pivot member connecting the second end of the link member to the keel bulb, and a guide track that confines movement of the horizontal axis pivot member to a path relative to the horizontal axis pivot connection between the keel member and keel bulb such that the keel bulb is held in a horizontal configuration as the keel member is lowered and raised. The link member may comprise a forward stay foil that extends from the keel bulb to a bow end of the hull assembly so as to deflect obstructions away from the keel member during operation of the vessel.

The hull assembly may comprise at least one hull compartment that houses the deployment mechanism for the wing assembly and keel assembly. The hull assembly may further comprise first and second outboard ballastable tanks that flank the hull compartment housing the deployment mechanism. The channel that receives the wing assembly in the retracted configuration may comprise a longitudinally extending channel set between the ballastable tanks in an aft portion of the hull assembly.

The hull assembly may further comprise at least one control plane that controls direction of the vessel during operation. The at least one control plane may comprise at least one pair of angled control planes that extend outwardly and downwardly from the hull assembly so as to be immersed during both surfaced and submerged operation of the vessel. The pair of angled control planes may be located proximate an aft end of the hull assembly. The at least one control plane may further comprise at least one pair of substantially horizontal control planes that control an attitude of the vessel during submerged operation. The pair of horizontal control planes may be mounted proximate a forward portion of the hull assembly. The forward pair of control planes may be mounted to an upper side of the hull assembly, forward of the channel in the aft portion of the hull assembly in which the wing assembly is received when in the retracted configuration.

In another aspect, the invention provides a retractable wind-powered propulsion apparatus that is mountable in a hull assembly of a vessel. The apparatus may comprise a wing assembly comprising at least one substantially rigid wing member; a keel assembly comprising at least one keel member; and a deployment mechanism comprising at least one actuator and a linkage interconnecting the wing assembly and the keel assembly, that in response to operation of the at least one actuator pivots said wing assembly and keel assembly simultaneously between (i) a deployed configuration in which said wing assembly and keel assembly extend outwardly above and below the hull assembly for wind-powered operation of said vessel; and (ii) a retracted configuration in which said wing assembly and keel assembly are angled back towards said hull assembly to reduce drag for submerged operation of the vessel.

These and other features and advantages of the present invention will be more fully appreciated from a reading of the following detailed description with reference to the accompanying drawings.

BRIEF DESCRIPTION OF THE DRAWINGS

FIG. 10 is a lower perspective, exploded view of the pulley and cable assemblies interconnecting the second gear box and clutch stage of the drive mechanism and the flap and main wing of the wing assembly;

FIGS. 11A-11B are, respectively, a lower perspective view of a non-powered pulley assembly connecting the main wing and flap of the wing assembly of the vessel of FIG. 6, and a bottom perspective, exploded view of the non-powered pulley assembly of FIG. 11A;

DETAILED DESCRIPTION

As will be described in greater detail below, the present invention provides a wind-powered vessel that is configurable for efficient operation in either surfaced or submerged modes. The vessel is eminently suited to unmanned, autonomous or semi-autonomous operation, however, it is envisioned that some embodiments may be configured to carry crew and/or other personnel.

Figure 1:
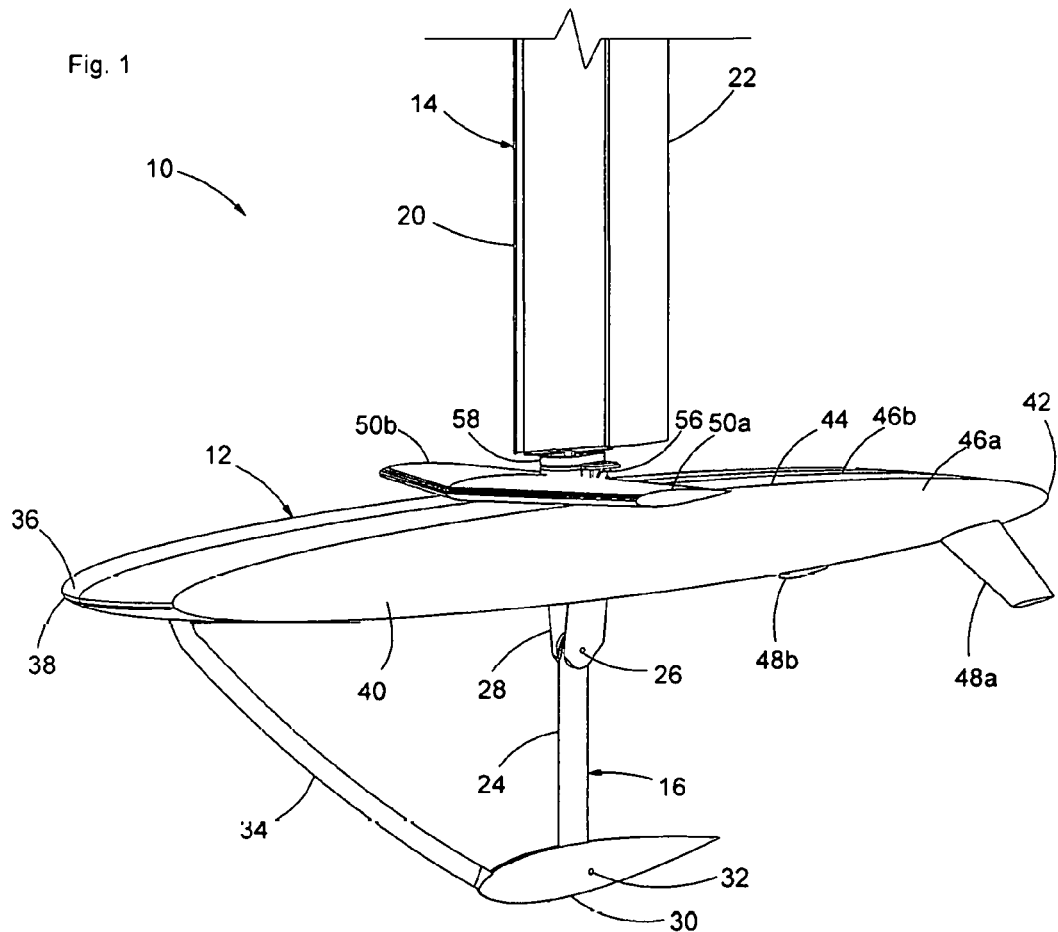
FIG. 1 is a perspective view of a submersible wind-powered vessel in accordance with a preferred embodiment of the present invention, showing the vessel with the wing and keel assemblies extended vertically to provide propulsion and stability for surface operation of the vessel.

Accordingly, FIG. 1 shows a submersible vessel 10 in accordance with the present invention. As can be seen the vessel includes a main hull assembly 12 to which are mounted a wing assembly 14 and keel assembly 16. To configure the vessel for surface operation, as shown in FIG. 1, a deployment mechanism housed within the hull assembly 12, as will be described in greater detail below, is actuated to raise the wing assembly 14 and concurrently lower the keel assembly 16, so that in combination the wing and keel assemblies allow the vessel to employ wind-powered propulsion and also have the stability and other characteristics necessary to function under surfaced conditions.

In the preferred embodiment that is illustrated, the wing assembly includes a main wing 20 having an airfoil configured to generate a force vector in response to movement of air thereover, and a trailing edge wing member 22 that is located proximate the trailing edge of the main wing member and is employed in adjusting the angle of attack of the main wing member relative to the wind and also cooperates with the main wing member in generating propulsive force. The main wing member upwardly extends generally vertically from the hull when erected, and is suitably formed of a lightweight, substantially rigid material such as molded fiber composite material or aluminum alloy, for example; trailing wing member 22 may be formed of the same or a similar material. In cross-section, the wing member (sometimes referred to as a "wingsail") is preferably configured as an airfoil that generates propulsive force (analogous to upward "lift" of an aircraft wing, but in a generally horizontal direction) regardless of whether the angle of attack is to the right or left of the wind, suitable foil configurations being known to those skilled in the relevant art. In the embodiment that is illustrated, the main wing member 20 houses a rigid spar, that forms a vertical mast when erected, however it will be understood that in some embodiments the shell or other structure of the wing member itself may serve this function without using an internal spar.

The keel assembly 16, in turn, includes a centerboard-shaped keel member 24 that extends downwardly below the hull when in the deployed configuration. Similar to the function of a conventional centerboard keel member 24 reacts against the water to hold the craft against lateral movement so as to generate forward motion in response to wind acting on the wing assembly. As will be described in greater detail below, the upper end of the keel member 24 is joined at a pivot connection 26 to a yoke 28 depending from the hull assembly, the yoke in turn being part of the linkage 29 (see FIG. 4) within the hull assembly for deploying the keel assembly and wing assembly. A keel bulb 30 is in turn attached to the lower end of the keel member 24 at a second pivot connection 32, to provide ballast and improve the hydrodynamic form of the assembly.

A forward stay foil 34 extends forwardly and upwardly from the keel bulb, the forward/upper end of the stay bar being connected to the hull assembly at a second pivot connection 36 proximate the bow end 38 of the latter. The stay foil forms a fixed-length link between the keel bulb and the hull, and also aids the vessel in deflecting and/or riding over ropes/cables, logs, rocks and other obstacles without fowling the keel assembly. The forward stay foil is preferably flattened in cross-section and aligned with the main keel member 24, to improve tracking characteristics of the vessel while at the same time minimizing water resistance/drag. In summary, the forward stay foil has three main functions, i.e., (1) it acts as a bumper for impact, (2) it acts as a guide for the folding of the keel assembly, and (3) it acts as a hydrofoil when the vessel is in surface sailing mode.

Hull assembly 12 includes a hydrodynamically contoured outer hull 40 that houses the deployment mechanism as well as other systems. In the preferred embodiment that is illustrated, the outer hull 40 has a comparatively broad beam, somewhat flattened in the horizontal plane and tapering towards the bow and stern ends 38, 42. The wing and keel assemblies 14, 16 extend generally perpendicular to the hull, preferably vertically along a common axis extending upwardly and downwardly from a location generally near a midpoint of the hull; the illustrated embodiment employs a single wing assembly, however it will be understood that some embodiments may employ multiple sail assemblies and/or keel assemblies, e.g., at locations spaced longitudinally along the length of the hull.

A longitudinal channel 44 flanked by stern portions 46a, 46b extends aft of the wing assembly in the upper side of the hull shell 40 to receive the wing assembly when the latter is retracted, as will be described below. Port and starboard stern planes 48a, 48b extend at outward and downward angles from the stern portions 46a, 46b of the hull, the downward angle of the stern planes ensuring that they will be kept immersed and therefore able to provide rudder functions while the vessel is surfaced. When the vessel is submerged, the stern planes 48*a*, 48*b* continue to function as rudders, but also act in conjunction with horizontal forward planes 50*a*, 50*b* located proximate the base of the wing assembly to control down/up attitude of the vessel.

Figure 3A:
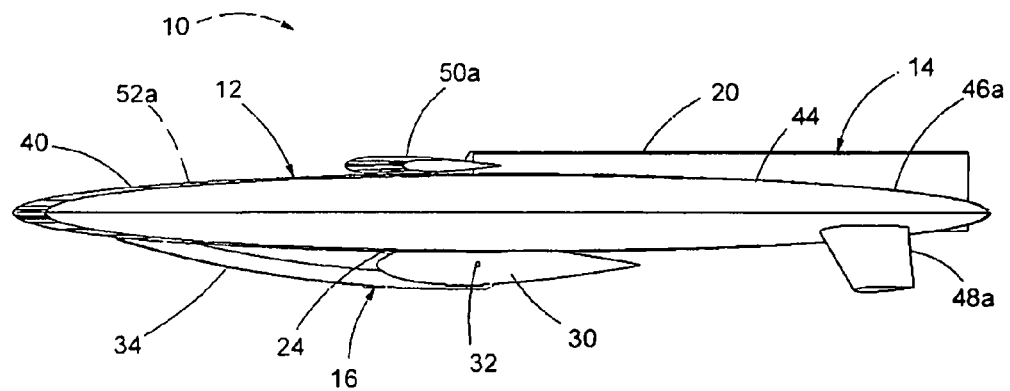
FIGS. 3A-3C are, respectively, side elevation, front elevation and top plan views of the submersible vessel of FIGS. 1-2, showing in greater detail the configuration of the vessel and the relation of the wing and keel assemblies to the hull assembly thereof when in the retracted configuration.
Figure 3B:
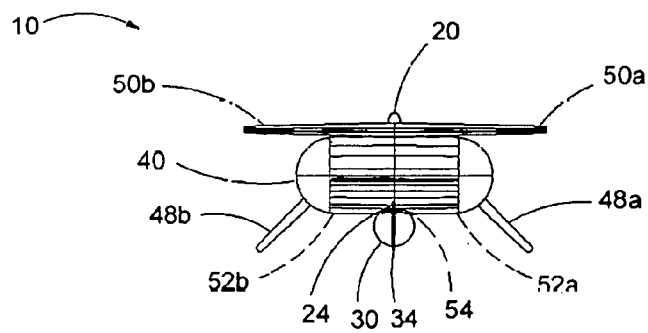
Figure 3C:
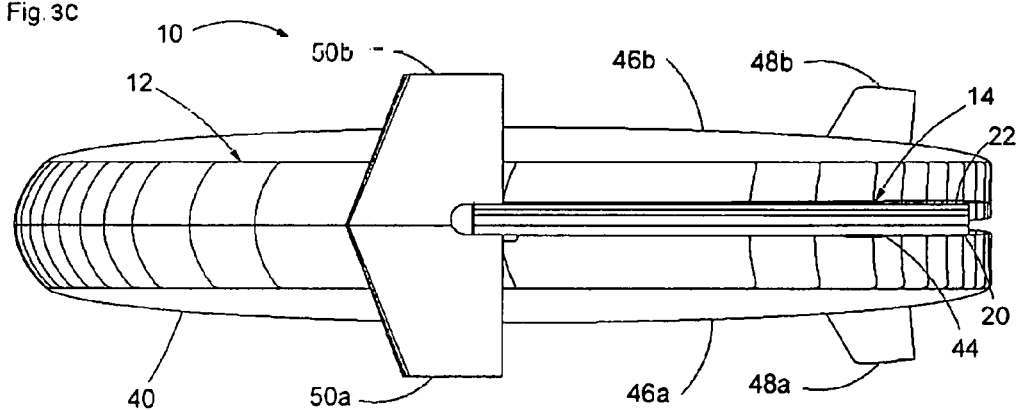

As can be seen in FIGS. 3A-3C, and in FIG. 3B in particular, the outer hull 40 encloses parallel, laterally spaced port and starboard pressure hulls 52*a*, 52*b*, that extend lengthwise within the two sides of the hull in a manner somewhat similar to the parallel hulls of a catamaran. The pressure hulls in the illustrated embodiment are in the form of crolate elipsoids with space between for the ring and keel folding mechanisms. The pressure hulls contain both ballast tanks and dry payload volumes. The ballast tanks are preferably in the form of bladders fitted within the ballast volumes, that are filled by onboard water pumps. To submerge, water is pumped into the bladders and air pressure builds up between the bladders and pressure hulls. This arrange ensures the ability to surface with minimal or nil additional expenditure of pumping energy; the bladders also permit compressed $CO_2$ to be used as an emergency blowing gas. The ballast sections of the pressure hulls are stressed for internal pressure (hoop tension stress), that composite materials are well suited to sustain. The pressure hulls are preferably constructed of a composite material or materials, such as carbon-fiber or glass-fiber composites for example, although aluminum or other metallic or non-metallic materials may be employed in some embodiments. The pressure hulls provide accommodation for batteries or other forms of power supply, depending on the intended mission, type of propulsion, and other design characteristics of the vessel; for example electric propulsion motors driving propellers may be mounted at the aft ends of the pressure hulls. In some embodiments onboard air compressors may be included for use with the bladder ballast tanks described above or with conventional forms of ballast tanks.

With the ballast tanks emptied the vessel assumes a positive buoyancy such that the hull assembly 12 will lie at the surface. With the vessel thus afloat (or before), the deployment mechanism may be operated to raise the wing assembly and lower the keel assembly so that the vessel assumes the configuration shown in FIG. 1. In this configuration, the vessel is capable of efficient surface operation using wind propulsion in the manner described above. In unmanned embodiments, onboard electronic controls, operating either autonomously or at the direction of a remote station, may employ the aft planes 48*a*-*b* in the manner of rudders to control the heading of the craft, and may also adjust the angle of incidence and relative orientations of the main and trailing wing members 20, 22 using a motor 56 and associated drive mechanism 58 at the base of the wing assembly. By adjusting the angle of incidence and the relationship between the main and trailing edge wing members, a broader range of headings can be maintained regardless of wind direction. At the same time, both stability and hydrodynamic efficiency are enhanced by the semi-catamaran configuration of tanks 52*a*-*b*.

Wind-powered surface operation gives the vessel the ability to transit significant distances at comparatively high speeds under most sea conditions, e.g., to transit between operating areas, close the distance to a target, and so on; in some embodiments surface movement may be augmented by electric motor propulsion units or other mechanical/electrical drive systems. Also, when surfaced, solar panels or other photovoltaic cells (not shown) on the upper side of the hull and/or the wing members can be employed to recharge batteries or other storage systems that supply power to the on-board electronics, deployment mechanism, propulsion motor, and other systems. Wind-powered or wave-actuated recharging mechanisms may also be included. Furthermore, operation on the surface facilitates communication of data to/from remote stations, e.g., via RF links.

Figure 2:
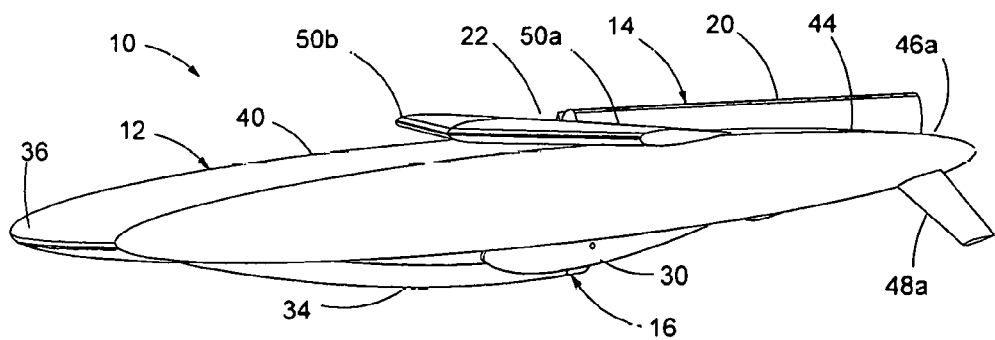
FIG. 2 is a second perspective view of the submersible vessel of FIG. 1, showing the vessel with the wing and keel assemblies retracted to provide a low drag hydrodynamic form for submerged operation of the vessel.

For submerged operation, the deployment mechanism is operated to lower the wing assembly 14 and raise the keel assembly 16, so that the vessel assumes a more compact, hydrodynamically clean configuration as shown in FIG. 2. As will be described in greater detail below, the mechanism pivots the wing sail downwardly and rearwardly t towards the aft end of the vessel, so that the wing assembly 14 nests within the channel 44 formed between the aft portions 46*a*-*b* of the hull. In the illustrated embodiment, lowering of the wing assembly is preceded or accompanied by the action of pivoting the trailing edge wing member 22, using motor 56, to a position in which the former is folded substantially flat adjacent the side of the main wing member, as seen from above in FIG. 3C. The wing assembly thus folded is compactly stowed in the aft channel 44 of the hull, with the leading edge of the main wing member projecting upwardly in the manner of a longitudinal rib or fin that enhances directional stability of the vessel when submerged. It will be understood, however, that in some embodiments the wing assembly may be folded about a horizontal plane (or at another angle), with the stowage channel or other recess being shaped accordingly so that the wing members will lie recessed therein; it will also be understood that while a closed-bottom stowage channel provides significant advantages, for example reducing loads on the wing assembly when the latter is lowered and stowed, in some instances the recess for receiving the lowered wing assembly may be a complete or partial gap, slot or other opening in or through the hull and without a bottom, rather than a closed-bottomed channel or trough as shown.

Operation of the deployment mechanism to lower the wing assembly also raises the keel assembly and angles it towards the rear of the craft so that both the wing assembly and the keel assembly retract towards the stern. As can be seen in FIG. 3A, the keel board 24 pivots to a rearward angle such that keel bulb 30 is moved to a position closely adjacent the underside of hull 40. Simultaneously, the forward stay foil 34 folds up towards the bottom of the hull in a scissors-like manner, but still extends below the hull and back from the bow to deflect obstacles and protect the keel bulb and keel board as described above.

With the wing and keel assemblies 14, 16 retracted and folded as shown in FIG. 2, the configuration of the vessel presents a clean hydrodynamic form with reduced projections, which in turn reduces drag and facilitates efficient operation in a submerged mode. To submerge the vessel, tanks 52*a*, 52*b* are flooded to give the vessel negative buoyancy to the extent desired, suitably employing valves controlled by the onboard electronics; buoyancy can be adjusted by supplying compressed air or other gas to the tanks from an onboard source, suitably a pressure tank or tanks that are charged or recharged when the vessel is surfaced. The aft planes 40*a*-*b* continue to function as rudders in the submerged mode, and also work in conjunction with the forward planes 50*a*-*b* to control the up-down attitude of the vessel as described above. Propulsion in the submerged mode is suitably provided by propellers driven by onboard electric motors, as noted above, however it will be understood that other suitable drive mechanisms may be used, such as gas turbines, chemically generated gas propulsion systems, and motor driven pump jet systems, for example.

In addition to improved hydrodynamics for submerged operation, the collapsed configuration shown in FIG. 2, with the wing and keel assemblies retracted, provides a compact configuration for storage and/or transportation of the vessel, e.g., in a conventional conex box. This is a significant advantage for transporting the craft into and out of operational areas, on board ships or cargo aircraft, or via rail or other modes of transport. Also, the collapsed configuration facilitates launching and recovery of the vessel, especially when done from a mother ship underway, in as much as the vessel is easier to handle and much less likely to sway and swing about than if the wing and keel assemblies were extended, and the wing and keel assemblies are also protected against damage and less likely to be fouled by handling lines and the like.

Figure 4:
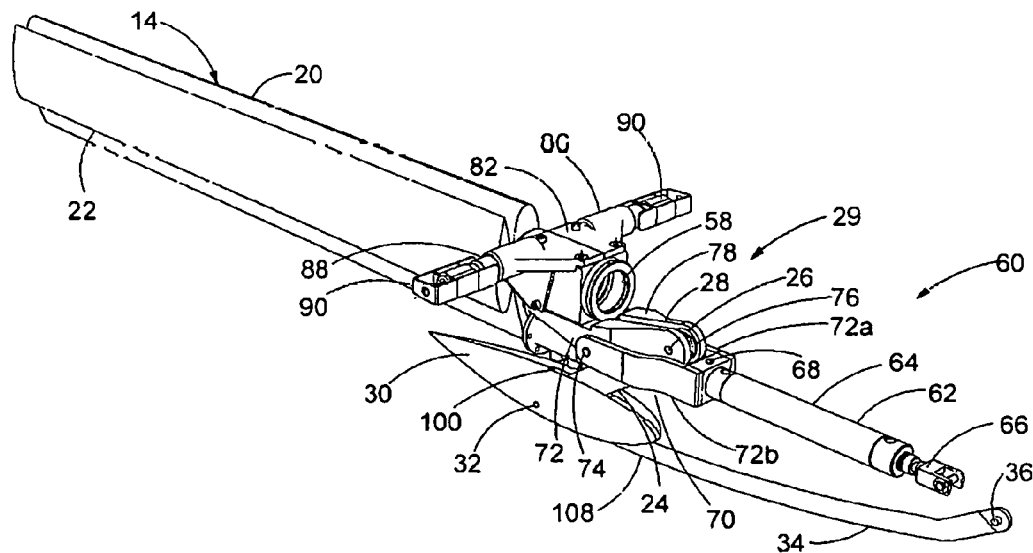
FIG. 4 is a perspective view of the wing and keel assemblies of the submersible vessel of FIGS. 1-2 and the deployment mechanism associated therewith, showing the assemblies in the retracted configuration.
Figure 5:
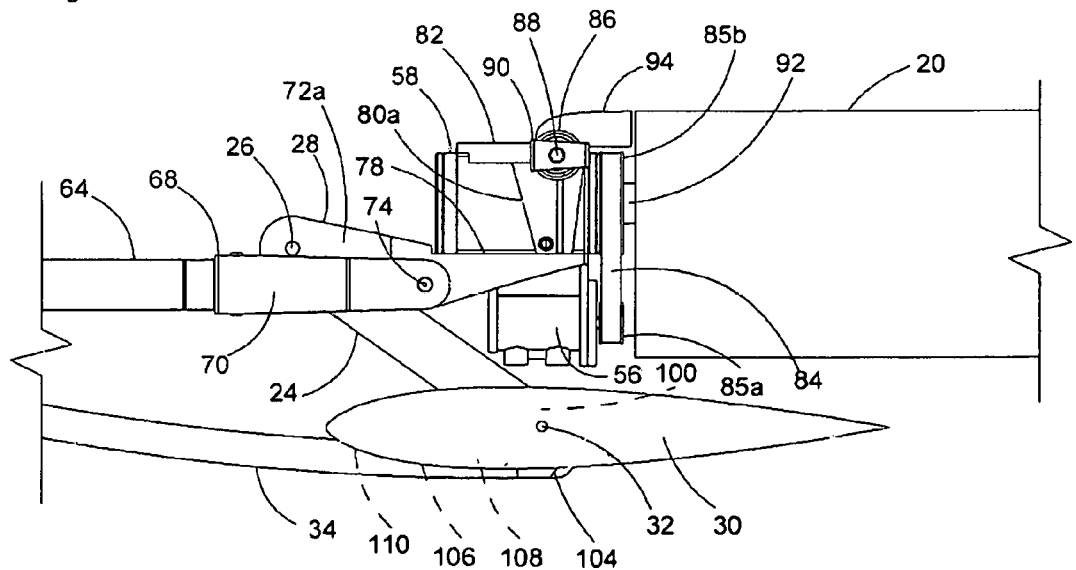
FIG. 5 is a partial, side elevational view of the wing and keel assemblies and deployment mechanism of FIG. 4, showing the drive section of the mechanism in greater detail.

FIGS. 4-5 show in greater detail the components of the wing and keel assemblies and also the associated deployment mechanism, the hull assembly being removed to provide a clearer view.

As can be seen therein, the deployment mechanism 60 includes an actuator 62, suitably in the form of a conventional hydraulic cylinder, having a housing 64 and a selectively extensible/retractable rod 66, the distal end of the latter being mounted to the hull structure, e.g., the forward end of hull compartment 54. At the opposite, aft end, the housing 64 is mounted to a rearwardly extending spacer block 68, that forms the head end of a fork member 70 having first and second side legs 72a, 72b. Actuation of the cylinder to extend rod 66 thus drives the fork member 70 in a rearward, aft direction relative to the hull, while retraction of the rod moves the fork member in the reverse, forward direction. It will be understood that other forms of linear actuation devices may be used in place of or in conjunction with the hydraulic cylinder shown in FIGS. 4-5, such as pneumatic cylinders, ball-screw mechanisms, and rack-and-pinion gear mechanisms, for example.

As can be seen with further reference to FIGS. 4-5, the two legs 72a, 72b of the fork member 70 form a rearwardly extending gap or slot that accommodates the yoke 28 that is attached to the keel assembly, when the latter is in its raised/retracted position. At its rear/aft end, the fork member is mounted to an upper part of the yoke at a horizontal-axis pivot connection 74, e.g., a horizontal pivot pin, that is located a spaced distance forward of/above the pivot connection 26 between the end of the yoke and the upper end 76 of keel board 24. An extension 78 mounted between the side plates 72a-b of the fork member extends upwardly/forward of pivot connection 74, and includes a mounting face that extends generally parallel to the main axis of the wing assembly. First and second bracket members 80a, 80b mounted to extension 78 extend generally perpendicular thereto, to a base plate 82 that in turn lies parallel to the mounting face at a spaced distance therefrom. Gear box 58 is mounted to the lower/aft side of the base plate 82, parallel to motor 56, the gear box being operatively connected to motor 56 by a toothed drive belt 84 routed over pulleys 85a, 85b.

A tube 86 mounted transversely along the upper aft portion of base plate 82 cooperates with a horizontal axle shaft 88 to form the main pivot axis for the wing and keel assemblies. As can better be seen in FIG. 4, the two outboard ends (i.e., the port and starboard ends) of the shaft 88 are received in support blocks 90. Blocks 90 are in turn mounted to load bearing portions (not shown) of the hull assembly, so that the wing and keel assemblies are supported for pivoting movement relative to the hull assembly, and also so that propulsive forces and other forces and other loads are transferred from the wing and keel assemblies into the hull assembly.

As was noted above, gear box 58 is mounted substantially parallel to the extension 78 of yoke 28, on base plate 82. The main wing 20 of the wing assembly is in turn mounted to the output shaft 92 of the gear box, with the main axis of the wing assembly being parallel thereto.

To reduce drag and prevent lines/obstructions catching on the base of the main wing, a small, streamlined fairing piece 94 is mounted to the "toe" of the main wing member so as to be disposed upwardly and forwardly when the wing assembly is in the, stowed position. It will be understood that, depending on the purpose of the vessel and other design factors, the wing assembly may not be completely horizontal in the retracted configuration, but instead may be angled or "leaned" back from vertical when stowed, and similarly the wing assembly may not be completely vertical or perpendicular to the hull when extended; likewise, the angles of the keel when stowed and extended may vary depending on design factors.

In summary, the wing assembly is carried on the extension at upper end of the yoke member 28, together with the motor and gear box, while the keel member is mounted at the lower end of the yoke member, the whole of the yoke member and extension thus forming a crank member that is pivotable relative to the hull of the vessel, about the horizontal axis defined by axle member 88 supported in bearing blocks 90.

At the lower end of the keel assembly, the keel board 24 is joined to bulb 30 at horizontal pivot connection 32. The keel bulb preferably has a generally bulbous shape somewhat similar to that of keel bulbs found on some conventional sailing craft, with the forward end being somewhat blunt and enlarged and the aft end tapering to a relatively sharp point. In addition to providing ballast, the keel bulb may also serve as a housing for one or more underwater sensors depending on the intended mission of the vessel, e.g., as a housing for magnetic sensors, hydrophones and/or sonar transducers.

A centerline slot 100 formed in the upper/forward portion of keel bulb 30 accommodates pivoting movement of the keel board 24 therein, so that the board is able to pivot between a horizontal orientation relative to the bulb to the angled orientation that is shown in FIG. 5. Slot 100 consequently allows the pivot connection 32 between the keel board and bulb to be located proximate the hydrodynamic center of the latter, facilitating operation of the linkage and minimizing undesirable stress on the assembly. The aft end of the forward stay foil 34 is also connected to keel bulb 30, by a horizontal axis pivot pin 104 captured for sliding movement in an arcuate track 106 that extends from a middle portion of the body to proximate a forward end thereof, that permits longitudinal movement of the end of the stay bar within the keel bulb during that transition between the deployed and stowed configurations. A second centerline slot 106 in the bottom/forward portion of the bulb keel accommodates scissors-like motion of the stay within the forward part of the bulb, the stay pivoting about connection 104 simultaneous with the forward/aft longitudinal movement. In combination, therefore, the components of the keel assembly are able to cooperate in a manner analogous to a four-bar linkage.

FIGS. 4-5 show the wing and keel assemblies in their retracted configurations, the wing assembly being lowered into the top of the hull and the keel assembly being brought up against the bottom as described above. In this configuration, hydraulic cylinder 62 is retracted, with the piston rod 66 drawing the body 64 of the cylinder up towards a forward end of the hull assembly. Then, to deploy the wing and keel assemblies, the hydraulic cylinder is actuated to extend rod 66, driving the body 64 of the cylinder in a rearward direction together with the spacer block 68 and fork legs 72a-b that are mounted to the aft end of the cylinder. As this is done, the ends of the fork legs 72a-b act on horizontal pivot connection 74, pushing the latter in a rearward/downward direction relative to the axis provided by axle 88. Inasmuch as axle 88 is held stationary by the bearing blocks 90 mounted in the hull, the motion of pivot connection 74 results in the yoke member 28 assembly pivoting in a downward arc about axis 88. As this is done, the extension 78 forming the upper end of the crank member moves towards a vertical orientation, together with the base plate and wing assembly that are carried thereon. Simultaneously, keel board 24 pivots relative to the lower end of the yoke member about axis 26, so that the yoke and keel board spread apart in a scissors-like manner as both transition towards a vertical orientation, while at the same time the lower end of the keel board pivots about horizontal axis connection 32 relative to keel bulb 30. It will therefore be appreciated that, in the embodiment illustrated in FIGS. 1-7, the linkage 29 that operates to extend and retract the wing and keel members in response to actuation of the hydraulic cylinder includes the yoke 28, the fork member 70 with legs 72a, 72b, and the perpendicular extension 78 and base plate 82 that support the wing member along with the gear box and motor, together with the associated axle shaft 88 and pivot connections 26, 74.

As extension of the hydraulic cylinder drives the lower end of keel board 24 in a rearward and downward direction relative to the hull, the keel bulb mounted thereon is thus likewise carried in a downward and rearward direction. To accommodate the downward and rearward motion of the bulb, the ends of the pivot pin 104 joining the bulb keel to the aft end of the nose are slidingly received in left and right channels in the sides of slot 108, that form the arcuate guide track 106. The arcuate path is configured with relation to pivot connections 104 and 32, and the motions of dagger board 24 and nose stay 34, to maintain the bulb keel substantially horizontal in both the raised and lowered positions, and preferably at all points between. As can be seen in FIG. 5, in the illustrated embodiment the rearward end of the guide track 106 extends to slightly aft of the pivot connection between the keel board and bulb, so that when the keel assembly is raised, connection 104 is positioned below and slightly rearward of connection 32; from here, guide track 106 extends forwardly and upwardly along a curved path, to a forward end 110 that lies substantially on the horizontal mid-plane of the keel bulb, such that the connection 104 between the nose stay and the bulb will be generally level with the connection 32 between the bulb and the dagger board when the assembly is in its extended/lowered position, the curved path followed by track 106 establishing an angular orientation between pivot connections 32 and 104 that holds the keel bulb horizontal throughout the range of travel.

In summary, simultaneous with the motion erecting the wing assembly, rotation of the crank member in response to extension of the hydraulic ram drives the dagger board 24 in an aft and downward direction so as to likewise rotate the board to an extended orientation. Pivot connection 26 provides the main axis of rotation, while pivot connections 32 and 104 allow the keel bulb 30 to pivot on the end of the keel board so as to maintain the latter in a horizontal orientation.

The system in FIGS. 4-5 thus provides a mechanism that is both compact and mechanically efficient, and that operates in response to actuation of a single hydraulic cylinder, or other linear actuator/drive and therefore offers a high degree of reliability with little or no maintenance over long periods of operation. Moreover, the arrangement and orientation of the components are well suited to efficient use of available space within a hydrodynamic hull form having a comparatively narrow beam and good sailing characteristics. Still further, the configuration and relationship of the components helps the assemblies sustain operational loads without excessive flex and/or damage, for example, lateral loads experienced during surface operation under strong wind conditions.

Figure 6:
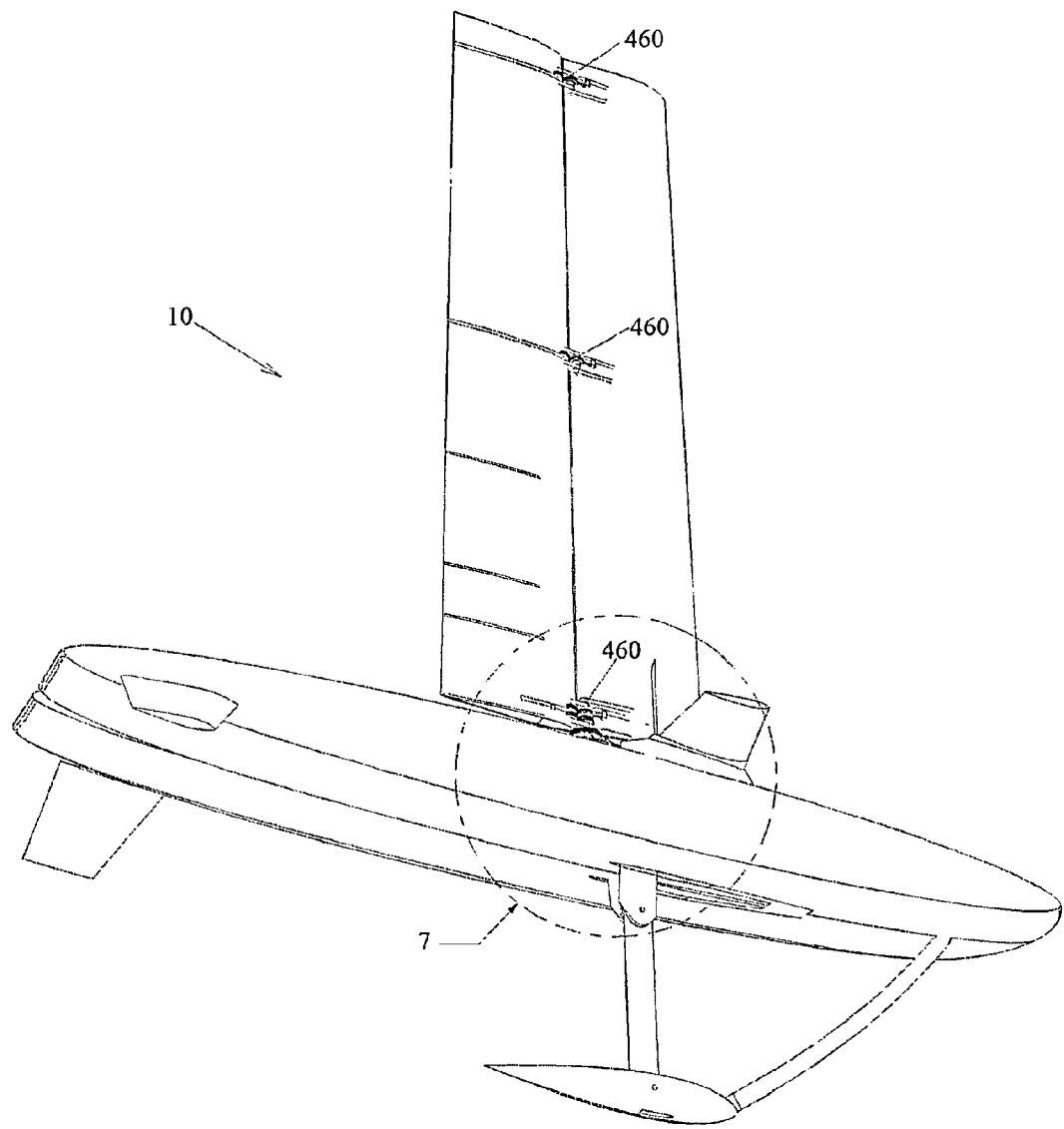
FIG. 6 is a bottom perspective view of the wind powered submersible vessel of FIG. 1, indicating generally the area of the motor and drive mechanisms that control the orientation of the main wing and flap of the wing assembly of the vessel.

FIGS. 6-11B show in greater detail the wing and drive mechanisms of the vessel, located generally in the area indicated at "7" in FIG. 6.

Figure 7:
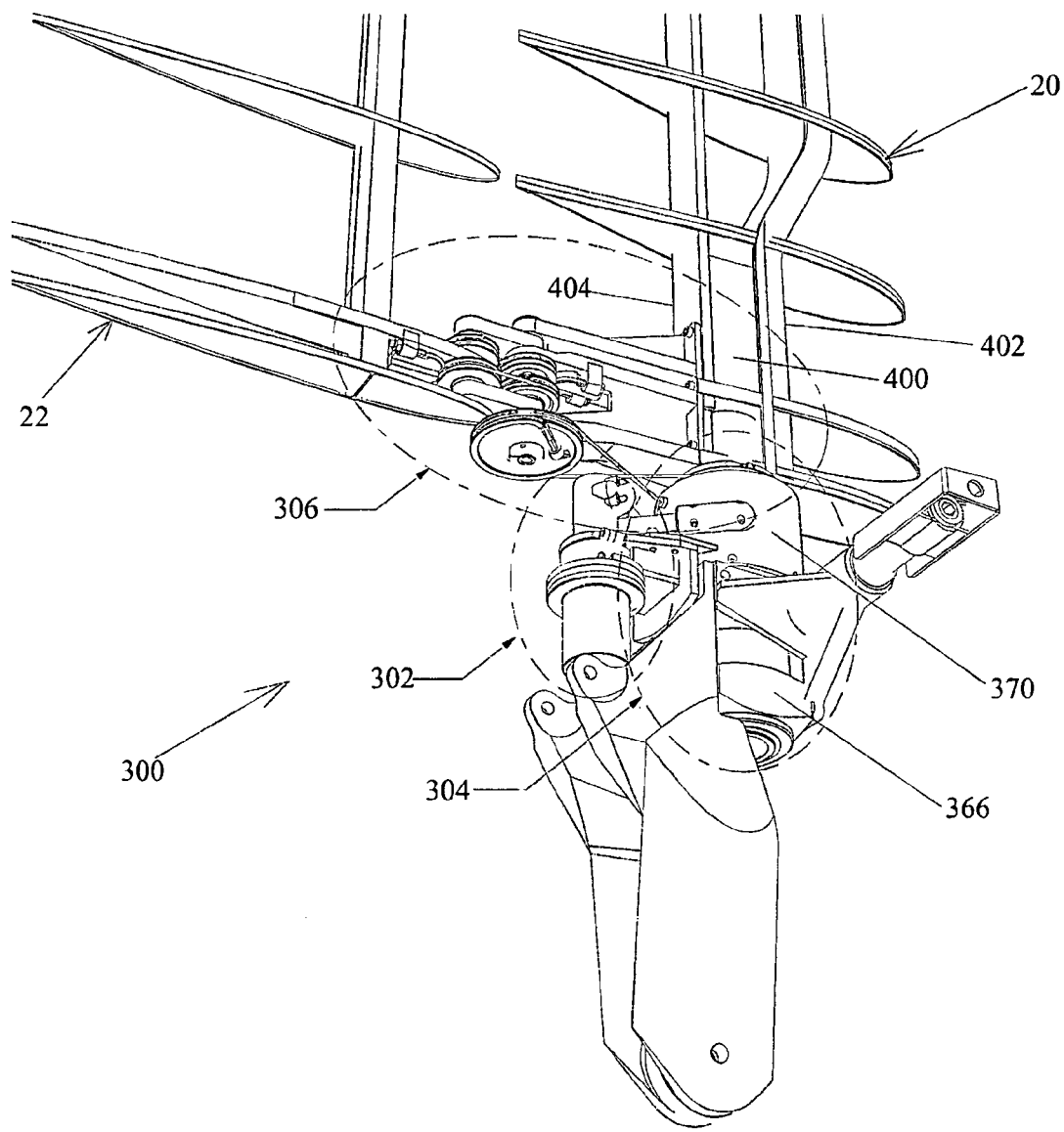
FIG. 7 is a lower perspective view of the drive mechanisms contained in the area indicated in FIG. 6, showing the relationship thereof to the wing and keel assemblies of the vessel.

As can be seen in FIG. 7, the drive mechanism 300 of the illustrated embodiment includes three main sections, namely, a motor and first stage reduction section 302, a second stage reduction and clutch section 304, and a pulley section 306 that supplies the output from the second stage reduction section to the main wing 20 and flap 22 of the wing assembly. The components of the drive sections are described below in the approximate order in which mechanical power is transmitted, beginning with motor 56.

Figure 8:
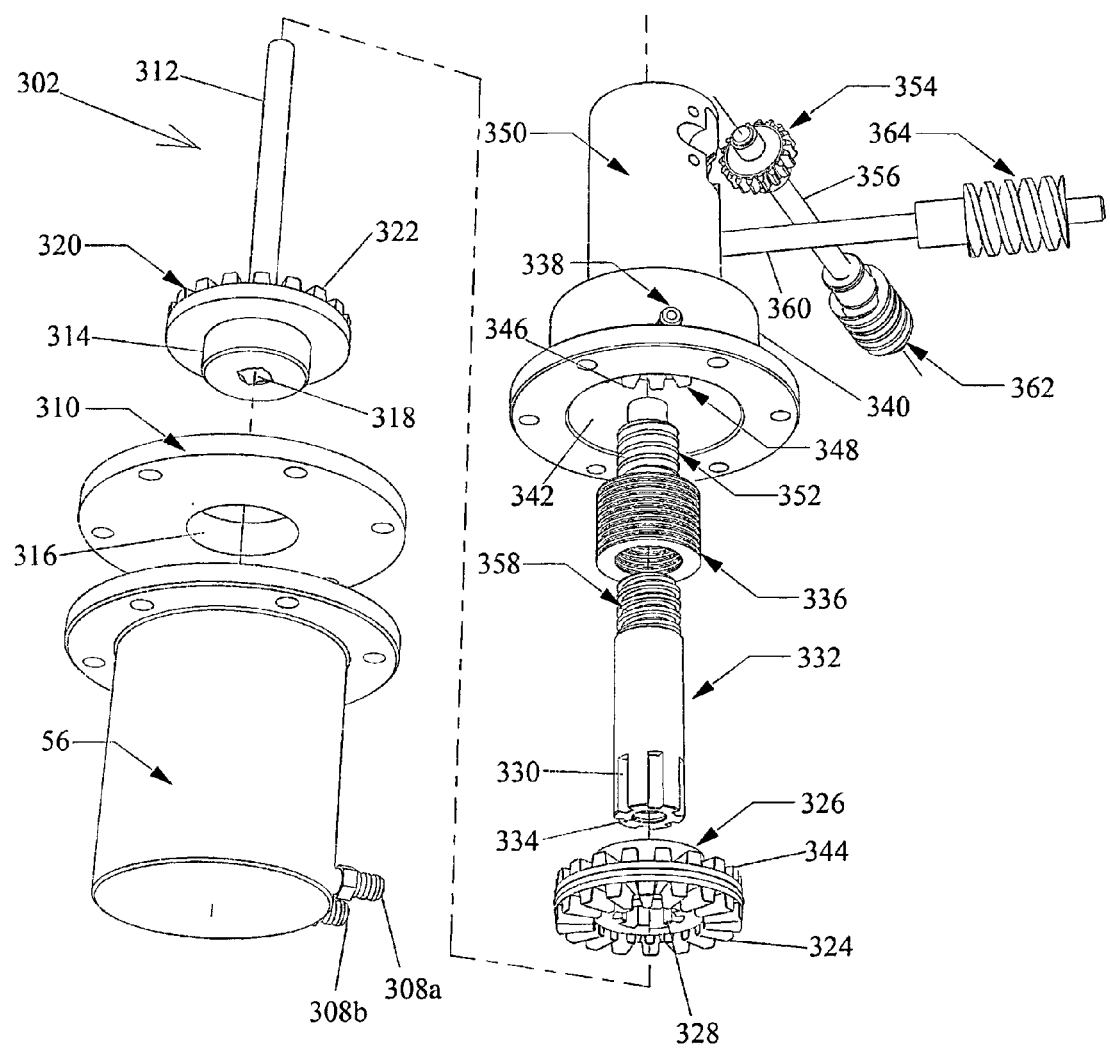
FIG. 8 is a lower perspective, exploded view of the motor and first stage gear assembly of the drive mechanism show in FIG. 7.

Referring to FIG. 8, pressure is supplied to motor 56 via connections 308a, 308b such that the motor is hydraulically operable in both directions of rotation. As will be described in greater detail below, the system uses a low pressure hydraulic dog clutch to allow the single hydraulic motor to rotate both the wing and flap together such that the flap angle relative to the wing is constant, or to only change the flap angle relative to the wing with the wing angle of incidence (AOI) held constant. Rather than a single motor two motors may be used to actuate the wing and flap in some embodiments. However, a single motor and dog clutch system is generally preferred for several reasons, namely: (a) the single motor plus clutch is more compact and lends itself to a folding wing configuration; (b) since changes of wing AOI are made more often than flap angle adjustments, it is more efficient to have both wing and flap operation geared together and driven by a single motor; and (c) two motors would need to be driven at exactly the same speed in order to change wing AOI at a constant flap angle relative to the wing, whereas a single motor plus clutch is much simpler to implement and control.

In the preferred embodiment shown in FIG. 8, the hydraulic motor 56 is suitably a low pressure (e.g., 75 psig working), low swept volume, high torque motor, having a square (e.g., ¼ inch) output shaft. An adapter plate 310 couples the motor and central flap drive shaft 312, and permits the motor to be assembled together with the hydraulic clutch housing, as will be described in greater detail below.

The central drive shaft 312 includes a lower boss 314 that passes through an opening 316 in the adapter plate, with a square drive socket 318 on the lower end that mates with the output shaft of the motor. A dog clutch ring 320 having upwardly facing teeth 322 is mounted to the shaft 312 above boss 314. Consequently, whenever motor 56 is rotating drive shaft 312 and dog clutch ring 320 are likewise rotating. The teeth 322 of the dog clutch ring 320 engage the lower teeth 324 of dog clutch piston 326. The dog clutch piston includes internal splines 328 that slidingly engage vertically elongate external splines 330 on the lower end of a second, outer drive shaft 332, the outer drive shaft having a vertical bore 334 through which the central shaft 312 passes so that the two are aligned concentrically.

As noted, the dog clutch piston 326 is vertically slidable on the lower end of the outer drive shaft 332. A compression spring 336, suitably a Belleville spring stack, mounted around the outer shaft 332 above the dog clutch piston 326, yieldingly biases the dog clutch piston in a downward direction to form an engagement between it and the dog clutch ring 320 on drive shaft 312; Belleville springs are generally preferred in the illustrated embodiment in that they function at lower levels of stress than multi-turn wave springs, and occupy smaller volumes than conventional coil springs that would satisfy the load versus deflection requirements.

With the clutch piston depressed into engagement with clutch ring 320 by the spring, the motor drives the main wing AOI shaft 332 via spline 330, as well as the central flap drive shaft 312. Then, when hydraulic pressure applied through port 338 in housing 340, the dog clutch piston 326 is driven upwardly along splines 330 and through the cooperating bore 342 of the housing, compressing the spring stack 336. As this is done, the lower teeth 324 on the dog clutch piston move out of engagement with the dog clutch ring 320 on the inner shaft 312, and the upper teeth 344 of the piston move into engagement with downwardly-projecting teeth 346 of an upper dog clutch ring 348 inside worm drive housing 350, thus holding the main wing AOI fixed. In this configuration, the motor now drives only the flap angle relative to the main wing.

With further reference to FIG. 8, flap drive worm 352 is pinned to the upper end of the central drive shaft 312, and meshes with worm gear 354 on horizontal shaft 356 that extends into the adjacent wing hub assembly. Drive worm 352 and gear 354 form the first stage in a two stage reduction gear chain. Another drive worm 358 formed on the upper end of the outer shaft 332 engages a second worm gear (not visible in FIG. 8) on the end of a second horizontal shaft 360, positioned below and 90° to the first shaft 356, the second worm gear being identical to the first worm gear 354. In the illustrated embodiment the gear ratio for both the wing AOI and flap first stage worm gears is 18:1. First and second horizontal axis second stage worms 362, 364 are mounted to the ends of shafts 356, 360 opposite the worm gears, thrust bearings at the end of each worm gear transmitting wing and flap generated torque into the hub case and core block.

FIG. 8 provides an exploded view of the internal components of the wing hub assembly 370 shown in FIG. 7, including second stage worm reduction gears for wing AOI rotation and flap actuation, and hydraulically-actuated multi-disc wet "basket" clutches for both flat rotation and wing AOI.

The wing hub assembly provides multiple functions. First, the hub assembly incorporates a second stage gear reduction (preferably 30:1 in the illustrated embodiment) for the main wing AOI and flap angle drive trains. Second, the adjustable clutches in the hub assembly protect the wing and flap structures, the flap actuation mechanism, and the wing and flap rotation gear trains from damage from excessive torque, due primarily to wave impact. Furthermore, flap and AOI clutches allow rapid on-demand decoupling of the wing and flap from their respective drive trains; the ability to thus "feather" the wing and flap enhances maneuvering agility and reduces energy usage when tacking or jibing. The vessel can therefore come about without use of the AOI drive as follows (with correlating conventional sailing terminology staring with "ready about"): (1) turn into the wind ("helms alee") disengage the wing and flap clutches to "feather" both surfaces ("up tacks and sheets") and then engage the flap clutch; (3) when the vessel heading is shy of the new tack's course by the desired wing angle of attack (e.g., 10-15°) engage the wing AOI clutch and set the flap to a nominal angle ("mains'l haul") and (4) on the new heading, perform a simple step-optimization of wing AOI and flap angles. Feathering-on-demand can also act to back up and augment the over-torque release function of the disc clutches, since the vessel's inertial sensing system may be set to command the wing and flap to feather in situations where this would be advantageous (for example, in a pitchpull or broach) even if the torque on the wing is not so high as to cause damage.

The components of the wing hub assembly include the following.

Figure 9:
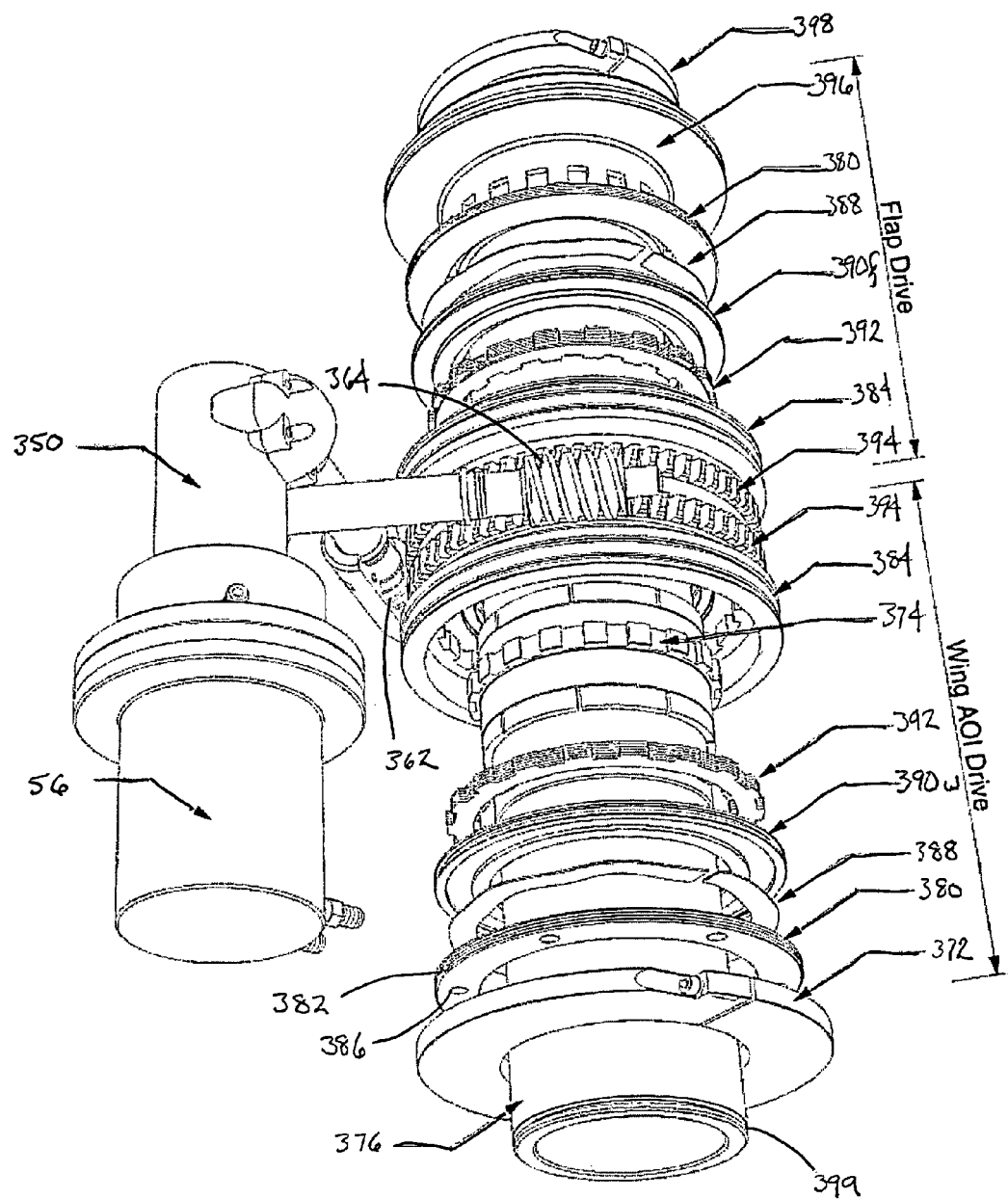
FIG. 9 is a lower perspective view of the second stage gear and clutch assemblies of the drive mechanism of FIG. 7.

A lower clamping ring 372 clamps the lower part of a wing drive spline collar 374 to the wing trunnion 376, the upper skirt of the spline collar being held by a similar clamp (not visible) between the worm gears in FIG. 9. The clamping ring 372 also transmits the weight of the wing through a thrust bearing to the core block.

The wing AOI drive and flap drive, as indicated in FIG. 9, each include "basket" clutch assemblies. The basket clutches, which are similar in design to motorcycle clutches except for being actuated by hydraulic pressure rather than by a push rod, have two main functions, namely, (1) to relieve excessive torque due to wind and waves before structural damage is incurred and (2) to make tacking and jiving both faster and more energy efficient.

The principal components are identical in both clutch assemblies, and are therefore identified by like reference numerals in FIG. 9. The clutch adjusting rings 380 are located at the outer/distal ends of the clutch assemblies and include outside threads 382 that engage cooperating inside threads on the clutch baskets 384, as well as holes 386 for receiving the pins of a spanner wrench. Rotating the adjusting ring using a spanner wrench applies an adjustable compression force to a wave spring 388, annular hydraulic piston 390 and disc clutch pack 392 within each basket 384. The wave spring provides the axial force necessary to generate tangential friction force in the disc clutch packs 392. The annular hydraulic pistons 390 in turn convert hydraulic pressure to axial force that compresses the wave springs 388, removing the clamping force on the disc clutch packs and disengaging the clutches.

The disc clutch packs 392 are wet clutches running in hydraulic fluid. The pack includes several discs (e.g., 3) having outer splines driven by cooperating splines inside the clutch baskets 384, the clutch baskets in turn being driven by worms 362, 364. Outer discs having inner splines in turn transmit torque to either the wing (lower drive) or flap (upper drive). Double entry (e.g., 30:1) second stage worm gears are preferred, although a single entry worm gear with a 60:1 reduction ratio may also be used.

As noted above, the wing drive spline collar 374 engages the clutch discs in the lower basket to transmit torque from the clutch plates to the wing trunnion 376. A corresponding flap drive spline collar 396, which also forms a cable idler, engages the clutch discs in the upper basket to transmit torque from the clutch plates to the flap actuation mechanism. At the top, the assembly is capped by an upper clamp ring 398 that functions in a manner corresponding to the lower clamp ring 372. Additionally, the upper clamp ring allows adjustment of axial play in the system.

The wing trunnion 376 in the illustrated embodiment is a tubular member having a constant outer diameter, preferably tapered inside towards the ends to reduce weight. The trunnion is retained from pulling up out of the core block 366 by a snap ring 399 proximate its lower end. The upper end of the trunnion is in turn fitted and mounted (e.g., welded) to a wing stub spar 400 (see FIG. 10) of the main wing. Preferred materials are stainless steel (e.g., 4130 stainless steel) or aluminum alloy (e.g., 6061-T6 aluminum), with the higher strength materials generally allowing a larger inside diameter for fitting of swivels and passage of items such as wires for sensors and communication antennae.

FIG. 10 shows the flap actuation assembly 306 in greater detail. As noted above, the flap actuation system not only controls the angle of the flap to the main wing, but it also functions to fold the flap against the side of the main wing for stowage. The system of the illustrated embodiment that folds about two axes by use of cables and pulleys provides several significant advantages. First, the two axes allow the flap to fold compactly against the wing, with the chords of the two airfoils lying parallel to one another. Also, the cable and pulley system is symmetrical and can fold either to port or starboard. The cables terminate with swaged studs that allow precise adjustment of cable tension, so that it easy to eliminate slack. Furthermore, the system is versatile and scalable: Changes to airfoil thickness, wing/flap gap, and so on do not require fitting different geared parts, being that a simple change in cable length is all that is required. Since cable tensile strength increases with the square of the cable diameter and multiple cables can be employed in parallel, increased stress due to a larger wing can easily be accommodated. Moreover, pulleys are inexpensive and easy to make in any required size.

As noted above and as can be seen in FIG. 10, the wing stub spar 400 is mounted to the wing trunnion 36, suitably by being slotted and welded to the latter. The lateral faces of the stub spar may conform to the inner mould lines of the wing when formed of a composite material. The wing king spar 402 is mounted to the front face of the stub spar 400, while a smaller aft spar is mounted to the rearward face together with flap actuator bracket 406. The flap actuator bracket, which is suitably an aluminum casting or stainless steel weldment, holds upper and lower bearings 408, 410 in its upper and lower arms, that support the flap hinge shaft 416. A pulley 418 is mounted to a central arm 420 of the bracket, in coaxial alignment with and at a spaced distance below the upper bearing 408, together with two cable termination bosses 422 that are located towards the stub spar and forward of the pulley. The end of the central arm 420 and pulley 418 are bored through to clear the flap hinge shaft 416.

A large flap pulley 424 is mounted to the lower end of shaft 416, below the lower arm 414 of the actuator bracket, and is driven by cable set 426 from the wing hub cable idler 396. The crossed cable configuration that is shown allows the flap to feather in the same direction of rotation as the wing when the wing AOI clutch disengages, either on demand or due to over-torque. Together with a small 2:1 pulley 428 that is set higher on the shaft above hinge arm 430, the large flap pulley is fixed on shaft 416, suitably by a Woodruff key and set screw or Fair-loc™ hubs.

The smaller flap pulley 428 thus also rotates together with shaft 416, and in turn drives a second, equal sized pulley 432 via cable set 434. The second flap pulley 432 is affixed to flap stub rib 436, for example being either made separately and permanently fixed to the flap stub rib or being integrally cast or machined as a part thereof. As noted above, pulley 432 is the same size as small flap pulley 428 and is driven therefrom via cable set 434 connected to cable terminations 435, the diameters of the pulleys 428, 432 being constrained by the length of the hinge arms 430 and 438. The wing gear pulley 418, which is positioned above pulley 428 and around, but not mounted to, shaft 416, is likewise fixed to bracket for example being pinned or welded thereto or cast as a part thereof. Pulley 418 is reeved together with a second, identically sized pulley 440 in a figure-eight relationship by cable set 442. Thus joined, the pulleys form the functional equivalent of two meshed gears that force equal rotation about the two flap rotation axes. The upper pulley pair 418-440 have slightly smaller diameters than the lower pulley pair 428-432, since more clearance is required to accommodate the figure eight cable set 442.

As noted above, the lower flap hinge arm 430 is located below pulley pair 428-432, the hinge arm suitably being formed of aluminum. The proximal end of the arm is fitted with a bearing for shaft 416, while the distal end is threaded to receive the threaded end of vertical bolt 444. The upper flap hinge arm 438 likewise includes a bearing for shaft 416 in its proximal end, the distal end being bored through for bolt 444 rather than threaded. A hinge arm tube 446 is clamped between the upper and lower flap hinge arms 438, 430 by bolt 444 so as to form a rigid assembly. The outer surface of the hinge arm tube is sized to run in two bearings (e.g., garlock bearings) fit to the bores of pulleys 432 and 440 and stub rib 436. Pulleys 432, 440 are located at the proximal (forward) end of the flap stub rib, while the distal (aft end) of the flap stub rib has an "I" section with a tapering web that provides a structural connection between it and a flap "king" rib 437, so that rotation of the stub rib causes rotation of the flap as a whole. The flap hinge shaft 416, having pulleys 424 and 428 clamped to it is in turn free to rotate in the upper and lower arm bearings 408, 410 in the arms of bracket 412. The upper end of the shaft is retained by a snap ring 448. The hinge arm assembly, including upper and lower arms 438, 430 and hinge arm tube 446, thus rotate about hinge shaft 416 on bearings 408, 410.

The bearings employed in the flap actuation assembly are preferably self-lubricating "dry" bearings made of cintered brass and polytetrafluoroethylene. The cable sets 426, 434, 442 include swaged balls on one end and swaged studs on the other (except for one cable in set 426 that has balls on both ends). The cables are rigged by sliding the ball ends into axial slot in the pulleys, winding the cables around the appropriate pulleys and feeding the stud ends into the termination bosses 422, 435, 450. Removing slack and centering is performed using the nuts on the swaged studs.

FIGS. 11A-11B show one of the mid-span/upper flap hinge assemblies 460, in assembled and exploded views respectively. The mid-span/upper flap hinge assemblies enforce equal rotation about both flap hinge axes and prevent jamming that would result if rotation about the several hinges was not identical. These hinge assemblies have "gear" pulley and figure-eight cable set arrangements with components similar or identical to the corresponding figure-eight "pulley gear" components described above. Accordingly, the assemblies each include a bracket 462 with upper and lower horizontal arms 464, 466, and a base 468 that mounts to the rearward spar 470 of the main wing. Pulleys 472, 474 are mounted to the upper arm of bracket 464 and flap stub rib 476, the aft end of the stub rib being mounted to a main rib 477 of the flap and also including cable termination bosses 478. In a manner corresponding to pulleys 418 and 440 described above the wing and flap pulleys are reeved together by figure eight cable set 478 to form the functional equivalent of two meshed gears that force equal rotation about the two flap rotation axes. The bracket 464 and stub rib 466 are connected by upper and lower hinge arms 480, 482, the upper hinge arm being positioned above the upper arm 464 of the bracket 462 and the upper end of pulley 474, and the lower hinge arm being located between pulley 472 and the lower bracket arm 466 at its forward end and the rearward end being located below the stub rib 476. The forward ends of the hinge arms are supported for pivoting movement on a vertical axis hinge tube 484, secured by a vertical bolt 486 that passes through the tube and hinge arms and is threaded into the lower arm 466 of bracket 462. At the aft/flap end, a second pivot tube 488 is mounted between the upper and lower hinge arms 480, 482 around a vertical bolt 490 that threads into the lower arm, the pivot tube having bearing surfaces that cooperate with the pulley 474 and stub rib 476.

As has been described above, the wing and flap drive mechanism in the illustrated embodiment employs a hydraulic motor. Hydraulic pressure is applied to the motor by a pump (not shown), preferably a geroter or vane pump driven by a switch reluctance (SR) electric motor. An SR motor is generally preferred over more common stepper motors due to the SR motor generating a higher starting torque and having better efficiency, and because the angular revolution of a stepper motor is not needed due to the mechanical reduction built into the drive train. Hydraulic pressure for the clutches is in turn preferably provided by solenoid-driven (SP?) piston "master cylinders," preferably having pistons sized such that a single stroke is more than enough to disengage a clutch. Check valves between the solenoid pump and clutch piston retain pressure so that the solenoid does not need to remain energized in order to hold the clutch in a disengaged state; rather, when a clutch needs to be re-engaged, a solenoid valve located in a separate return line from the clutch of the hydraulic reservoir releases pressure. Use of an electro-hydraulic system provides significant advantages over a purely electrical system, including versatility, fewer rotating shafts or sliding rod seals, and better leakage resistance and tolerance.

The two axes flap and wing mechanism and drive mechanism have been described above in the context of an installation in the submersible vessel 10. It will be understood, however, that the system and the drive mechanism may be employed with other vessels, some of which may not be submersible and some of which may not include a keel assembly. For example, the wing and flap system and the drive mechanism may be employed on a displacement hull vessel without a keel that may include one or more wing sails that may employ the drive mechanism and/or pull down for loading/unloading of the vessel or when not in use.

Figure 12A:
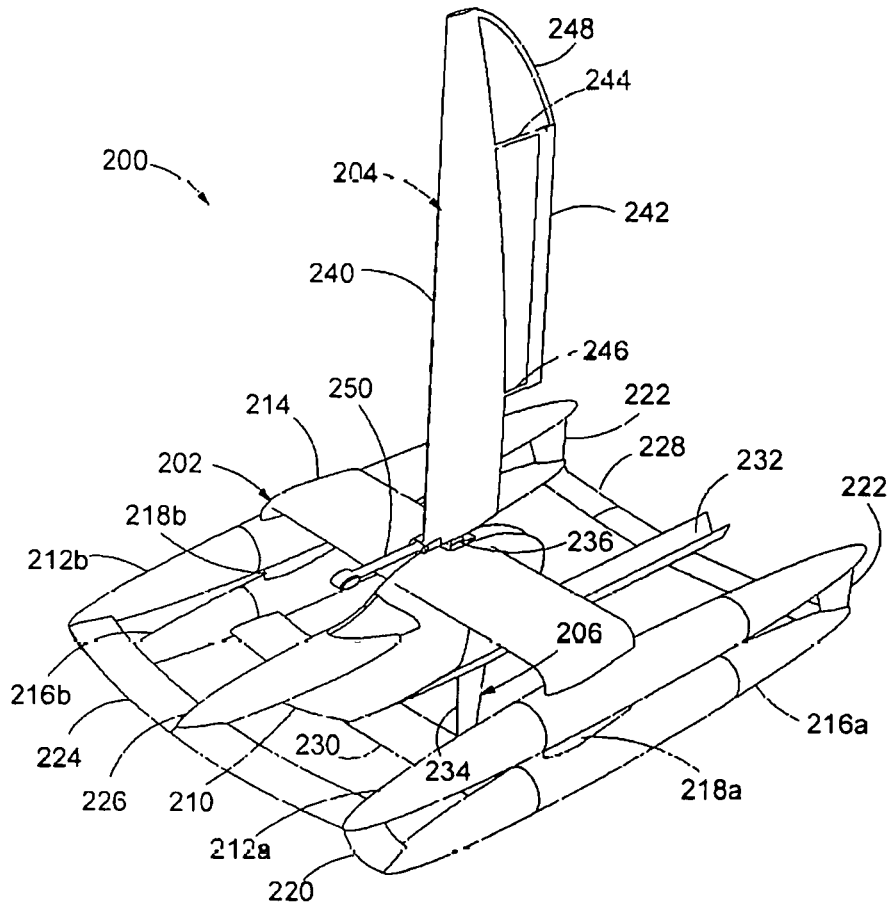
FIGS. 12A-12B are first and second perspective views of a wind-powered submersible vessel in accordance with another embodiment of the present invention, showing respectively the vessel with the wing and keel assemblies extended for surface operation and retracted for submerged operation.
Figure 12B:
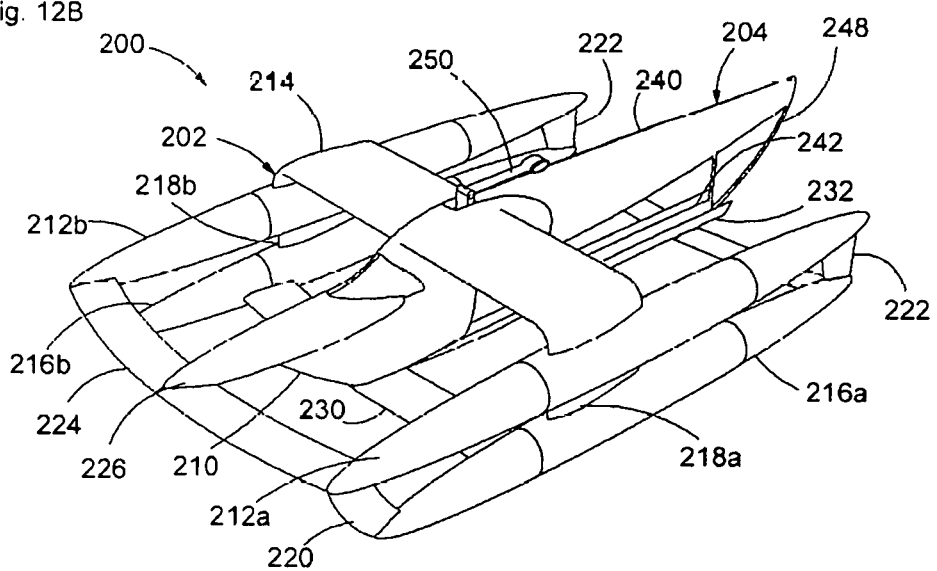
Figure 13A:
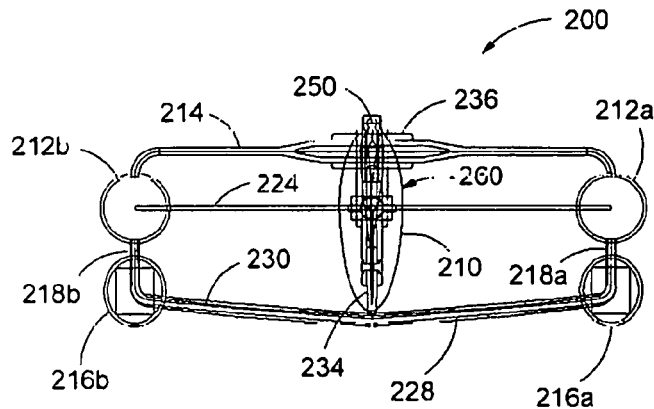
FIG. 13A is a vertical, transverse cross-sectional view, partially in phantom, of the wind-powered submersible vessel of FIGS. 12A-12B, showing the configuration of the hull assembly and its relation to the deployment mechanism for the wing and keel assemblies in greater detail.
Figure 13B:
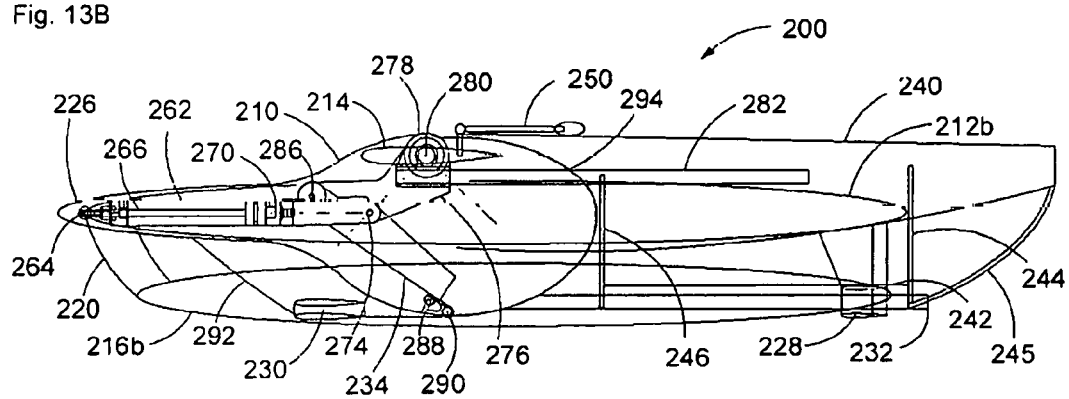
FIG. 13B is a vertical, longitudinal cross-sectional view of the vessel of FIGS. 12A-12B, showing the deployment mechanism and wing and keel assemblies in greater detail.
Figure 13C:
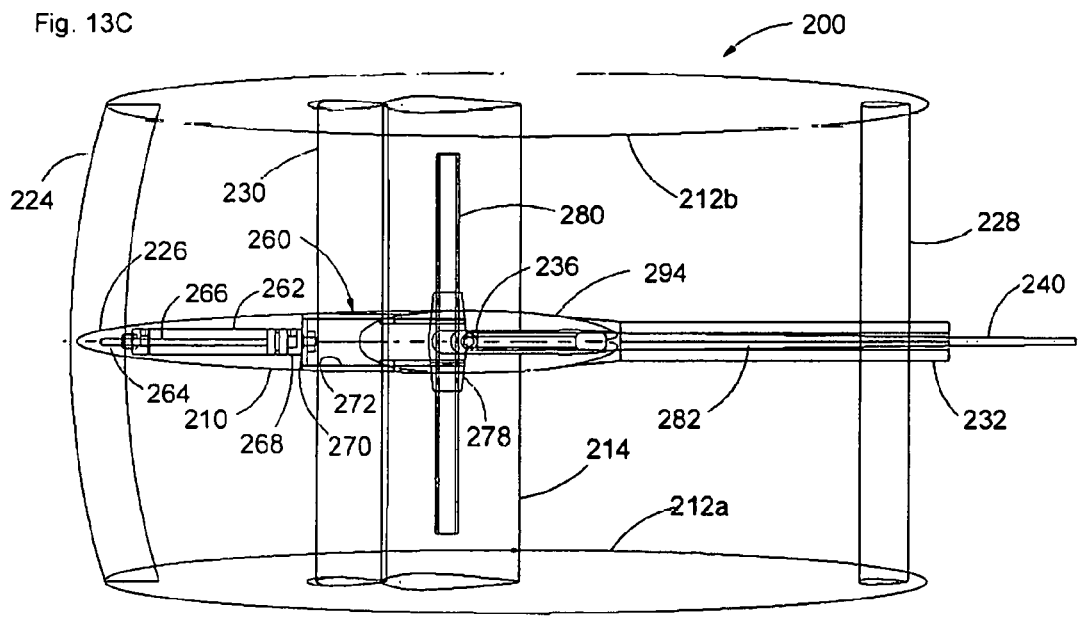
FIG. 13C is a horizontal cross-sectional view, partially in phantom, of the vessel of FIGS. 12A-12B showing the relationship between the central hull containing the deployment mechanism and the outboard buoyancy/ballast tanks in greater detail.

FIGS. 12A-12B show a submersible vessel 200 in accordance with a second embodiment, of the invention, sized somewhat larger and particularly adapted to extended periods of surface operation, that includes a hull assembly 202, wing assembly 204 and keel assembly 206, corresponding in function to the hull, wing and keel assemblies described above.

Figure 14:
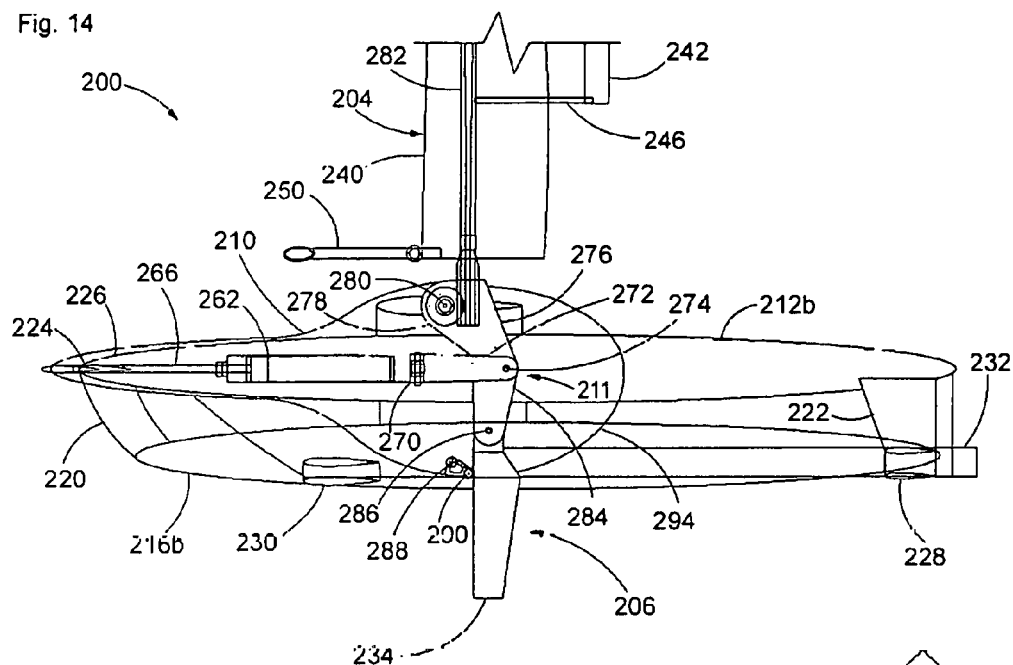
FIG. 14 is a vertical, longitudinal cross-sectional view partially in phantom, of the vessel of FIG. 12A-12B, showing the relationship of the components of the deployment mechanism and wing and keel assemblies with the latter in an extended position.
Figure 15:
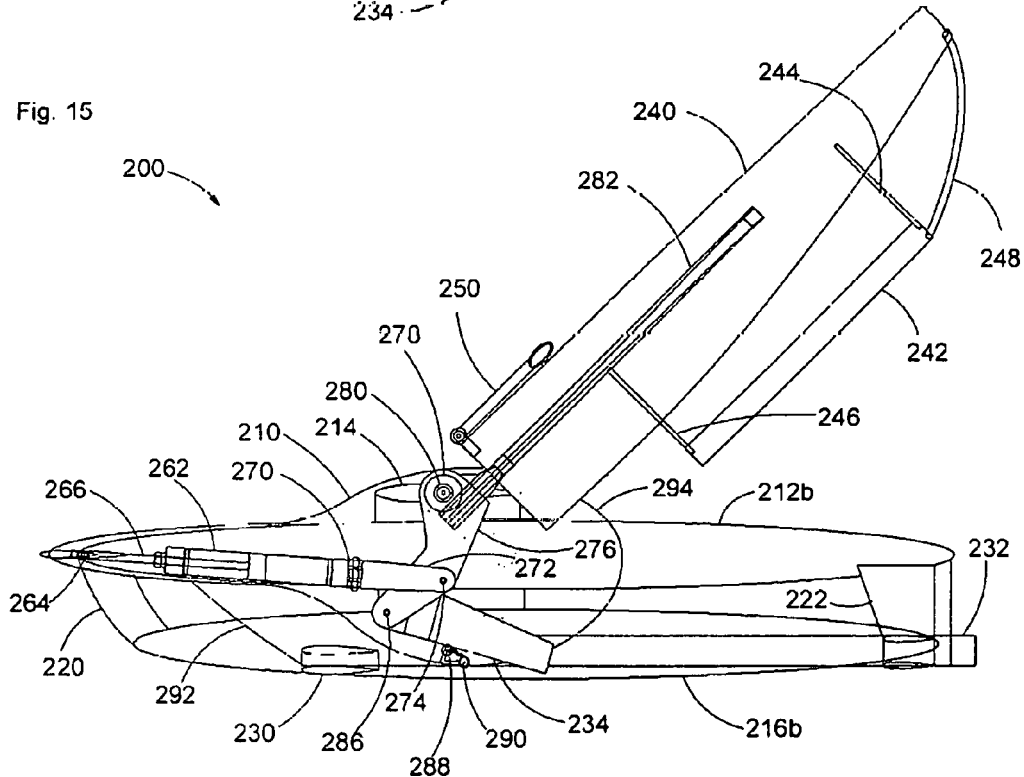
FIG. 15 is a vertical, longitudinal cross-sectional view, partially in phantom, of the vessel of FIG. 12A-12B, showing the relationship of the components of the deployment mechanism and wing and keel assemblies with the latter in a partially retracted position.

Hull assembly 202 includes a central hull compartment 210 that houses a deployment mechanism and linkage 211 (see FIG. 14) for extending and retracting the wing and keel assemblies in a manner generally similar to that described above. Hull compartment 210 is flanked by port and starboard outboard hull tanks 212a-b, mounted on the ends of a transversely extending upper bridge member 214 that spans the vessel beamwise and supports the central hull compartment 210. The outboard hull tanks preferably have tapered, low drag forms as shown, to facilitate efficient operation in both surfaced and submerged modes, and the central hull compartment 210 is likewise preferably hydrodynamically contoured. Port and starboard lower ballast tanks 216a, 216b are mounted below tanks 212a-b respectively, on downward extensions 218a-b of bridge member 214. In addition, the vertical pairs of tanks are joined at the ends by forward and aft struts 220, 222, the struts preferably being flattened somewhat in the forward-to-aft direction. The lower ballast tanks may be similar in shape to the upper tanks, each pair of tanks preferably being aligned with their axes in a common vertical plane and parallel with one another, and also parallel to the longitudinal centerline of the vessel.

A horizontal cross-member 224 spans the bow end of the craft to interconnect the forward ends of tanks 212a-b, the central hull compartment having a forward extension 226 that is in turn mounted to a mid portion of the cross-member. A second horizontal cross-member 228 is mounted to and spans the ends of the lower ballast tanks 216a-b so as to be immersed when the vessel is afloat. A third horizontal cross-member 230 is mounted between the lower ballast tanks at a position forward of the keel assembly 206, the mid-span portion of cross-member 230 being mounted to the central hull compartment 210 to support the latter from below. Towards the rear, an upwardly facing channel member 232, preferably somewhat "V" or "U" in cross-section, extends from the central hull compartment, the aft end of the channel member being mounted atop the rear cross-member 228.

Buoyancy of submersible vessel 200 is controlled by flooding/emptying tanks 216a-b and/or 212a-b, in whole or in part. In addition, sensors or other equipment may be housed in or on the tanks themselves, the bridge structure 202 preferably being hollow so as to permit control/data cables and other lines to be routed therethrough, between the tanks and central hull compartment 210; for example, propulsion motors and storage batteries may be mounted in or on the lower ballast tanks 216a-b, with propellers (not shown) located proximate the rearward ends thereof so as to be kept submerged when the vessel is in a surfaced condition. Rudders may be mounted on or incorporated in the struts 222 between the aft ends of the ballast tanks. Flaps or similar structures may in turn be mounted on or incorporated in the aft and/or forward horizontal cross-members 228, 224, to serve as diving planes for controlling attitude of the vessel when submerged.

The center hull 210 provides room for housing for the control, sensor and other electronic systems of the vessel, in addition to the deployment mechanism for raising/lowering the wing and keel assemblies. The broad, generally horizontal upper surface of the transverse bridge member in turn provides an area eminently suitable for mounting/positioning of photovoltaic panels e.g., for charging storage batteries when the vessel is surfaced.

Similar to the embodiment described above, the keel assembly 206 of vessel 200 includes a keel board 234 that pivots between lowered and raised positions, as seen in FIGS. 6A and 6B, but in this instance without keel bulb and stay pieces. The motor-gear box 236 of the wing assembly is located at the top of the central hull compartment, with the wing assembly extending vertically therefrom when deployed. In the embodiment illustrated in FIGS. 6A-B, the wing assembly includes a main wing member 240 and a trailing wing member 242 that is analogous in function to the trailing edge wing member described above, mounted rearwardly of the main wing member on horizontal spars 244, 246. A curved upper spar 248 in turn extends between the rear wing member 242 and upper end of the main wing member 240, to stabilize the trailing wing member and provide rigidity to the overall assembly. A sensor arm 250 is mounted at the base of the wing assembly and projects horizontally into clear air ahead of the wing and above the central hull compartment when the wing assembly is in its raised configuration.

The mechanism for extending/retracting the wing and keel assemblies operates similar to that described above. In response to the piston of the hydraulic actuator being extended, the wing is raised and the dagger board lowered, to the extended orientations shown in FIG. 6A, placing the vessel in configuration for surface operation. In response to the piston of the hydraulic actuator being retracted, the wing assembly pivots downwardly through a rearward arc until the trailing wing member 242 is received and supported in channel member 232, similar to the manner in which the wing assembly of the embodiment described above is received in channel structure 44, the V- or U-shaped contour of the channel member being configured to cooperate with the rear edge of the wing assembly to cradle the latter and support it not only vertically but against side-to-side forces as well. In this position, the curved top spar 248 serves the additional purpose of guiding handling lines and the like away from the end of the wing assembly, e.g., during launching/recovery operations. As the wing is lowered, the sensor arm 250 pivots 180° in a vertical plane, from the forward projecting orientation shown in FIG. 6A to the rearwardly extending orientation shown in FIG. 6B, in which arm lies compactly against and in line with the upper edge of wing member 240.

Thus, similar to the embodiment described above, the wing and keel assemblies of the vessel 200 are rapidly and efficiently transitionable between an extended configuration for surfaced operation and a retracted configuration for submerged operation or storage. The multiple hull members joined by struts and cross-members impart strength and rigidity to the vessel, and also serve to increase vessel survivability. The wing assembly nestled between the aft ends of the outboard hull members and supported in channel member 232, is both clean hydrodynamically and well protected against damage during submerged operation.

As can be seen in FIGS. 7A-7C, the deployment mechanism 260 is housed efficiently within the hydrodynamic contours of the center hull 210. At the bow end, the pointed forward extension 226 of the central hull that is mounted to cross-member 224, encloses a longitudinally extending hydraulic cylinder 262, generally similar in operation to the hydraulic cylinder described above. The distal end 264 of the cylinder rod 266 is mounted to cross-member 224, within housing 226, so that axial loads developed by the hydraulic cylinder during operation are bourne primarily by the rigid cross-member that is in turn supported from the outboard tanks 212a-b. The opposite, aft end 268 of the hydraulic actuator is mounted to a spacer block 270 at the head end of a fork member 272, the two side plates of which extend aft therefrom to a horizontal axis pivot connection 274 joining the end of the fork member to the upper end of the keel board 234. Pivot connection 274 also joins the end of the fork member to a middle portion of a crank member 276. The upper portion of the crank member includes a relatively large diameter horizontal-axis bearing sleeve 278 that pivots an axle shaft 280, the ends of the latter extending outwardly from the bearing sleeve and being mounted in the bridge member 214 of the hull assembly so as to distribute loads into the latter. The wing assembly is supported on an internal mast 282 that together with the motor and gearbox is mounted to the upper end portion of crank member 276, with the center of gravity preferably being behind the axis of the horizontal pivot shaft 280 when the wing assembly is raised. The lower portion 284 of the crank member is in turn joined to an upper end of keel board 234, at a third horizontal pivot connection 286. The lower portion of the keel board, below pivot connection 286, rests atop a guide plate 288 and stationary roller pin 290, the operation of which will be described below. Thus, in the embodiment that is shown in FIGS. 12A-15, the linkage 211 that operates to extend and retract the wing and keel members in response to actuation of the hydraulic cylinder 262 includes the fork member 272 and crank member 276, together with the associated axle shaft 280 and pivot connections 274, 186.

As can be seen in FIGS. 7A-7C, the main body of the center hull 210 is vertically elongate in cross-section, so as to compactly enclose the downwardly and upwardly-extending portions of the deployment mechanism and wing and keel assemblies without creating excessive frontal area or drag. Aft of the pointed forward extension 226, the body curves downwardly to form a cutwater 292 for efficient surface operation. The rear of the center hull is in turn enclosed by a hydrodynamically-contoured fairing 294.

Operation of the deployment mechanism 260, to extend and retract the wing and keel assemblies is illustrated in FIGS. 8-9. First, FIG. 8 shows the vessel with the wing and keel assemblies extended, for wind-powered surface operation. To bring the assemblies to this configuration, hydraulic cylinder 262 is actuated to extend rod 266, forcing the body of the cylinder and the fork member 272 mounted thereto in a rearward direction, away from the stationary rod end 264 that is mounted to cross-member 224. In so doing, the fork member 272 drives a middle portion of crank member 276 in the rearward direction, at pivot connection 274. Since pivot connection 274 is offset below the axis of the main horizontal pivot provided by axle shaft 280 and bearing sleeve 278, the rearward motion of the fork member causes the upper portion of the crank member to rotate about shaft 280, raising mast 282 and the wing member supported thereon from a horizontal, stowed position to the vertical, raised position shown in FIG. 8. Simultaneously, due to the rotation about shaft 280, the lower portion 284 of the crank member, together with the pivot connection 286 thereon, moves through a downward and rearward arc; the depending blade of keel board 234 in turn rotates in a downward and forward direction, about the pivot connection 286 at its upper end, pivoting to the extended, generally vertical orientation shown in FIG. 8.

To move the wing and keel assemblies to their retracted configurations, hydraulic cylinder 262 in turn is actuated to retract rod 266, drawing the body of the cylinder in a forward direction relative to the hull assembly as shown in FIG. 9. As this is done, the middle portion of the crank member is drawn forwardly through a downward arc, pivoting the wing assembly about shaft 280 towards the retracted/stowed position, i.e., in a clockwise direction as viewed in FIG. 9. Simultaneously, the lower end portion of the crank member, at a spaced distance below the pivot axis of shaft 280, swings through an upward and forward arc, drawing the keel board 234 with it; a pivot connection 264 at the forward end of the hydraulic actuator 262 allows the actuator to change angles within the interior of the extension of the hull, in order to accommodate movement of pivot connection 274 in a vertical direction as the crank member swings through its arc. As this is done, the leading edge of the keel board rides over roller pin 290 and then guide plate 288, causing the keel board to rotate about pivot 286, in a counterclockwise direction in FIG. 9, so that the keel board shifts away from its vertical orientation and to a more shallow angle as it is drawn into the hull by the crank member. When performed underway, water resistance acting against the lower end of the keel board assists in rotating the latter upwardly towards the hull, while the weight of the wing assembly aft of the main pivot 280 aids in rotation of the crank member as the wing assembly is lowered, facilitating a rapid transition from a surfaced to submerged configuration.

The hull configurations described above provide significant advantages, especially with respect to the vessel missions and modes of operation that have been noted. It will be understood, however, that the mechanism of the present invention may be used in or supplied for use with hulls having configurations other than the examples illustrated herein, as well as with or for other forms of keels and/or wings. Furthermore, it will be understood that some of vessels so equipped may not be submersible (e.g., they may be confined to surfaced and/or semi-submerged operation), and moreover that some may be of a recreational nature rather than having a commercial or military purpose It will be understood that the scope of the appended claims should not be limited by particular embodiments set forth herein, but should be construed in a manner consistent with the specification as a whole.

What is claimed is:

1. A submersible vessel, comprising:
a hull assembly;
a wing assembly comprising at least one substantially rigid wing member;
a keel assembly comprising at least one keel member; and
a deployment mechanism comprising at least one actuator and a linkage interconnecting said wing assembly and said keel assembly, that in response to operation of said actuator pivots said wing assembly and said keel assembly simultaneously between the (i) a deployed configuration in which said wing assembly and said keel assembly extend outwardly above and below said hull assembly for wind-powered surfaced operation of said vessel and (ii) retracted configuration in which said wing assembly and said keel assembly are angled back to retract towards a stern end of said hull assembly to reduce drag for submerged operation of said vessel.

2. The submersible vessel of claim 1, wherein said linkage of said deployment mechanism comprises:
a crank member that is supported from said hull assembly for rotation about a first substantially horizontal axis.

3. The submersible vessel of claim 2, wherein said actuator comprises:
a linear actuator pivotally connected to the crank member for rotation about a second axis that is offset below said first axis so as to form a lever arm between the first axis and second axis, so that said crank member pivots in a generally vertical plane in response to operation of said actuator.

4. The submersible vessel of claim 3, wherein said linear actuator comprises at least one hydraulic cylinder having a first end mounted to said hull assembly and a second end mounted to said crank member.

5. The submersible vessel of claim 3, wherein said crank member of said operating linkage comprises:
an upper portion having said wing assembly mounted thereto, so that said wing member is raised in response to said crank member being pivoted towards a vertical orientation and lowered in response to said crank member being pivoted towards a horizontal orientation.

6. The submersible of claim 5, wherein said crank member of said operating linkage further comprises:
a lower portion having said keel member of said keel assembly mounted thereto, so that said keel member is lowered in response to said crank member being pivoted towards a vertical orientation and is raised in response to said crank member being pivoted towards a horizontal orientation.

7. The submersible vessel of claim 6, wherein said operating linkage further comprises:
a connection joining said lower portion of said crank member with an upper portion of said keel member for rotation about a third horizontal axis, about which said keel assembly and said wing assembly pivot so as to converge and diverge angularly as said keel assembly and wing assembly are retracted and extended.

8. The submersible vessel of claim 1, wherein said hull assembly comprises:
an opening that receives said wing assembly when lowered to said retracted configuration.

9. The submersible vessel of claim 8, wherein said opening that receives said wing assembly when lowered to said retracted configuration comprises:
a longitudinal channel shaped to receive and support said wing assembly in said retracted configuration.

10. The submersible vessel of claim 1, wherein said wing assembly comprises:
a wing member; and
a flap member located proximate a trailing edge of said wing member.

11. The submersible vessel of claim 10 wherein said drive mechanism further comprises:
a motor; and
a gear train that selectively applies an output of said motor to:
(a) rotate said wing member and said flap member together when in said extended configuration such that said flap member is held at a constant angle relative to said wing member; and
(b) rotate said flap member to different angles relative to said wing member with said wing member being held at a constant angle of incidence.

12. The submersible vessel of claim 1, wherein said wing assembly further comprises:
a drive mechanism that orientates said wing member relative to said hull assembly and to wind direction to produce propulsive force when said wing assembly is in said extended configuration.

13. The submersible vessel of claim 12, wherein said drive mechanism further comprises:
a pulley and cable assembly that rotates said flap member about first and second axes so as to lie flat against a side of said wing member when said wing assembly is in said retracted configuration.

14. The submersible vessel of claim 1, wherein said keel assembly further comprises:
a keel bulb pivotally mounted to a lower portion of said keel member for rotation about a fourth horizontal axis; and
a linkage that maintains the keel bulb in a generally horizontal orientation as the keel assembly is extended and retracted.

15. The submersible vessel of claim 14 wherein said linkage that maintains said keel bulb in a generally horizontal orientation as the keel assembly is extended and retracted comprises:
a forward stay having a first end mounted to said hull assembly at a second end;

a horizontal axis pivot member connecting said second end of said link member to said keel bulb; and a guide track that confines movement of said horizontal axis pivot member to a path relative to said horizontal axis pivot connection between said keel member and said keel bulb such that said keel bulb is held in a horizontal configuration as the keel member is lowered and raised.

16. The submersible vessel of claim 1, wherein said hull assembly comprises:

first and second outboard pressure hulls that flank said wing assembly and said keel assembly.

17. The submersible vessel of claim 16, wherein said first and second outboard pressure hulls each comprise:

at least one ballastable chamber operable so as to submerge and surface said vessel.

18. The submersible vessel of claim 17, wherein said hull assembly further comprises:

a longitudinal channel located intermediate said first and second pressure hulls that receives said wing assembly when said wing assembly is in said retracted configuration.

19. The submersible vessel of claim 17, wherein said hull assembly further comprises:

a pair of angled control planes located proximate an aft end of said hull assembly, said angled control planes extending outwardly and downwardly from said hull assembly so as to be immersed during both surfaced and submerged operation of said vessel; and a pair of horizontal control planes mounted proximate a forward portion of said hull assembly so as to control an attitude of said vessel during submerged operation.

20. A submersible vessel, comprising:

a hull assembly;

a wing assembly comprising at least one substantially rigid wing member;

a keel assembly comprising at least one keel member; and a deployment mechanism comprising at least one actuator and a linkage interconnecting said wing assembly and said keel assembly, that in response to operation of said actuator pivots said wing assembly and said keel assembly simultaneously between the (i) a deployed configuration in which said wing assembly and said keel assembly extend outwardly above and below said hull assembly for wind-powered surfaced operation of said vessel and (ii) retracted configuration in which said wing assembly and said keel assembly are angled back towards said hull assembly to reduce drag for submerged operation of said vessel;

said linkage of said deployment mechanism comprising a crank member that is supported from said hull assembly for rotation about a first substantially horizontal axis; and said actuator comprising a linear actuator pivotally connected to the crank member for rotation about a second axis that is offset below said first axis so as to form a lever arm between the first axis and second axis, so that said crank member pivots in a generally vertical plane in response to operation of said actuator.

21. The submersible vessel of claim 20, wherein said linear actuator comprises at least one hydraulic cylinder having a first end mounted to said hull assembly and a second end mounted to said crank member.

22. The submersible vessel of claim 20, wherein said crank member of said operating linkage comprises:

an upper portion having said wing assembly mounted thereto, so that said wing member is raised in response to said crank member being pivoted towards a vertical orientation and lowered in response to said crank member being pivoted towards a horizontal orientation.

23. The submersible of claim 22, wherein said crank member of said operating linkage further comprises:

a lower portion having said keel member of said keel assembly mounted thereto, so that said keel member is lowered in response to said crank member being pivoted towards a vertical orientation and is raised in response to said crank member being pivoted towards a horizontal orientation.

24. The submersible vessel of claim 23, wherein said operating linkage further comprises:

a connection joining said lower portion of said crank member with an upper portion of said keel member for rotation about a third horizontal axis, about which said keel assembly and said wing assembly pivot so as to converge and diverge angularly as said keel assembly and wing assembly are retracted and extended.

25. The submersible vessel of claim 24, wherein said wing assembly and said keel assembly converge towards a stern end of said hull assembly as said wing assembly and keel assembly are retracted.

26. A submersible vessel, comprising:

a hull assembly;

a wing assembly comprising at least one substantially rigid wing member said wing assembly comprising:

a wing member;

a flap member located proximate a trailing edge of said wing member; and a drive mechanism that orientates said wing member relative to said hull assembly and to wind direction to produce propulsive force when said wing assembly is in said extended configuration, said drive mechanism comprising:

a pulley and cable assembly that rotates said flap member about first and second axes so as to lie flat against a side of said wing member when said wing assembly is in said retracted configuration;

a motor; and a gear train that selectively applies an output of said motor to:

(a) rotate said wing member and said flap member together when in said extended configuration such that said flap member is held at a constant angle relative to said wing member; and (b) rotate said flap member to different angles relative to said wing member with said wing member being held at a constant angle of incidence.

27. A submersible vessel, comprising:

a hull assembly;

a wing assembly comprising at least one substantially rigid wing member;

a keel assembly comprising at least one keel member; and a deployment mechanism comprising at least one actuator and a linkage interconnecting said wing assembly and said keel assembly, that in response to operation of said actuator pivots said wing assembly and said keel assembly simultaneously between the (i) a deployed configuration in which said wing assembly and said keel assembly extend outwardly above and below said hull assembly for wind-powered surfaced operation of said vessel and (ii) retracted configuration in which said wing assembly and said keel assembly converge towards a stern side of said hull assembly to reduce drag for submerged operation of said vessel;

said keel assembly further comprising:
   a keel bulb pivotally mounted to a lower portion of said keel member for rotation about a fourth horizontal axis; and
   a linkage that maintains the keel bulb in a generally horizontal orientation as the keel assembly is extended and retracted.

28. The submersible vessel of claim 27 wherein said linkage that maintains said keel bulb in a generally horizontal orientation as the keel assembly is extended and retracted comprises:
   a forward stay having a first end mounted to said hull assembly at a second end;
   a horizontal axis pivot member connecting said second end of said link member to said keel bulb; and
   a guide track that confines movement of said horizontal axis pivot member to a path relative to said horizontal axis pivot connection between said keel member and said keel bulb such that said keel bulb is held in a horizontal configuration as the keel member is lowered and raised.

29. A submersible vessel, comprising:
   a hull assembly, said hull assembly comprising:
      first and second outboard pressure hulls that flank said wing assembly and said keel assembly, said first and second outboard pressure hulls each comprising:
         at least one ballastable chamber operable so as to submerge and surface said vessel;
         a pair of angled control planes located proximate an aft end of said hull assembly, said angled control planes extending outwardly and downwardly from said hull assembly so as to be immersed during both surfaced and submerged operation of said vessel;
         a pair of horizontal control planes mounted proximate a forward portion of said hull assembly so as to control an attitude of said vessel during submerged operation;
      a wing assembly comprising at least one substantially rigid wing member;
      a keel assembly comprising at least one keel member; and
      a deployment mechanism comprising at least one actuator and a linkage interconnecting said wing assembly and said keel assembly, that in response to operation of said actuator pivots said wing assembly and said keel assembly simultaneously between the (i) a deployed configuration in which said wing assembly and said keel assembly extend outwardly above and below said hull assembly for wind-powered surfaced operation of said vessel and (ii) retracted configuration in which said wing assembly and said keel assembly are angled back towards said hull assembly to reduce drag for submerged operation of said vessel.

30. A retractable wind-powered propulsion apparatus that is mountable in a hull assembly of a submersible vessel, said apparatus comprising:
   a deployment mechanism comprising at least one actuator and a linkage interconnecting said wing assembly and said keel assembly, that in response to operation of said actuator pivots said wing assembly and said keel assembly simultaneously between the (i) a deployed configuration in which said wing assembly and said keel assembly extend outwardly above and below said hull assembly for wind-powered surfaced operation of said vessel and (ii) retracted configuration in which said wing assembly and said keel assembly are angled back to converge towards a stern end of said hull assembly to reduce drag for submerged operation of said vessel;
   a keel assembly comprising at least one keel member; and
   a linkage assembly interconnecting said wing assembly and said keel assembly, that in response to operation of said at least one actuator pivots said keel assembly simultaneously with said wing assembly to a retracted configuration where said keel assembly is angled back towards said hull assembly with said wing assembly to reduce drag for submerged operation of said vessel, said linkage of said deployment mechanism comprising:
      a crank member that is supported from said hull assembly for rotation about a first substantially horizontal axis, said actuator comprising:
         a linear actuator pivotally connected to the crank member for rotation about a second axis that is offset below said first axis so as to form a lever arm between the first axis and second axis, so that said crank member pivots in a generally vertical plane in response to operation of said actuator.

31. The retractable wind-powered propulsion apparatus of claim 30, wherein said linear actuator comprises at least one hydraulic cylinder having a first end mounted to said hull assembly and a second end mounted to said crank member.

32. The retractable wind-powered propulsion apparatus of claim 30, wherein said crank member of said operating linkage comprises:
   an upper portion having said wing assembly mounted thereto, so that said wing member is raised in response to said crank member being pivoted towards a vertical orientation and lowered in response to said crank member pivoted towards a horizontal orientation.

* * * * *